United States Patent Office
3,507,850
Patented Apr. 21, 1970

3,507,850
POLYMERIC FUGITIVE AZO DYES DERIVED FROM METHACRYLATE ALKYL ESTER, METHACRYLIC ACID AND A DYE MONOMER CONTAINING SULFONIC ACID GROUPS AND A METHACRYLOYL GROUP
Werner Victor Cohen and Erik Kissa, Wilmington, Del., assignors to E. I. du Pont de Nemours and Company, Wilmington, Del., a corporation of Delaware
No Drawing. Filed May 25, 1966, Ser. No. 552,715
Int. Cl. C09b 43/00; D06p 1/52
U.S. Cl. 260—160
11 Claims

ABSTRACT OF THE DISCLOSURE

Polymeric fugitive dyes which are useful for color coding textile fibers, which are insensitive to pH changes encountered during normal textile fiber processing operations, and which are easily and completely removable from the textile fibers, said fugitive dyes derived from: alkyl methacrylate ester in which the alkyl group contains 1 to 18 carbon atoms for example ethyl, hexadecyl and octadecyl esters; methacrylic acid or a water-soluble salt thereof; and a dye monomer of the structure $$DX—COC(CH_3)=CH_2$$

in which DX is a dye residue derived from an azo, anthraquinone or methine dye of the formula DX—H, which dye contains at least one sulfonic acid group or water-soluble salt thereof, such as an ammonium salt derived from a water soluble amine, and X is

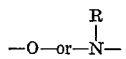

wherein R is hydrogen or lower alkyl.

---

During the production of textiles, it is difficult to distinguish by sight the various fibers used and thus confusion sometimes arises as to the identity of a particular fiber. To prevent this confusion, it has been suggested that the fibers be color coded during the various stages of textile production. One method of color coding which has great promise for this use is to temporarily dye each particular fiber type with a characteristic color thus allowing operational personnel to recognize the fibers on sight by their color. While in theory this is an ideal solution to the problem, in practice it has not been completely successful because of the lack of suitable dyes which can be temporarily applied to the fiber. To be completely successful, a temporary or fugitive dye must be (a) easy to apply to the fiber, (b) available in a variety of easily distinguishable colors, (c) completely removable at the proper time and (d) insensitive to pH changes encountered in subsequent processing operations.

None of the presently available materials offered as fugitive dyes possess all of these desired characteristics. Some cannot tolerate certain process steps to which the fibers are subjected. Others are not completely fugitive; they stain one or more types of fibers permanently. This staining is by far the most serious problem since it is the most widespread and least tolerable. Fibers which are stained cannot be permanently dyed properly since the color of the stain interacts with the color of the permanent dye to produce undesired shade variations.

It is a principal object of this invention to provide fugitive dyes which can be completely removed from all fibers when desired without permanent staining. Another object is to provide fugitive dyes which can be applied to all fibers. A further object is to provide fugitive dyes which are insensitive to pH changes encountered in a majority of subsequent processing steps. These and other objects will become apparent from the following description of this invention.

It has now been discovered that the above objects are provided by a fugitive dye consisting essentially of polymeric dye in which the polymer forming units are derived:

(a) about 30 to 94.5% by weight from alkyl methacrylate ester in which the alkyl group contains 1 to about 18 carbon atoms,
(b) about 5 to 60% by weight from methacrylic acid or a water-soluble salt thereof, and
(c) about 0.5 to 50% by weight from dye monomer of the formula $DX—COC(CH_3)=CH_2$ in which DX— is a dye residue derived from an azo, anthraquinone or methine dye of the formula DX—H which dye contains at least one sulfonic acid group or water-soluble salt thereof, wherein X is

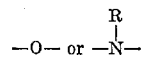

where R is hydrogen or lower-alkyl;

said polymeric dye having a minimum water solubility of at least about 5% at a pH greater than 7 and a maximum water solubility of less than about 1% at a pH of 3, and said dye monomer being at least about ten times as soluble in water as said polymeric dye at a pH of 3. For brevity, the sulfonic acid group and water-soluble salts thereof will hereinafter be referred to as sulfo groups.

As was indicated earlier, the major problem associated with prior art fugitive dyes is that they permanently stain one or more types of common fibers. It has now been found that polymeric fugitive dyes can overcome this problem only if unpolymerized dye monomer is completely removed from the polymeric dye. If the dye monomer is not removed, it may act as a direct or acid dye, depending on the nature of the fiber, leaving a permanent stain.

The essential feature of the polymeric dye of this invention is that they have a water solubility of less than 1% at a pH of 3, while the dye monomers containing at least one sulfo group are at least about ten times more soluble in water at a pH of 3. As a result of this combination of properties, the polymeric dye is readily separated from unreacted dye monomer by precipitation of the polymeric dye in acidic aqueous media, thereby providing a fugitive dye consisting essentially of polymeric dye. It is difficult or impossible to completely remove unpolymerized dye monomer unless this combination of properties exists. Thus, the use of the particular polymeric dyes of this invention overcomes the staining problem generally associated with prior art fugitive dyes.

Preferably the fugitive dyes of this invention do not noticeably change shade when subjected to pH changes in the range of 3 to 10. By "do not noticeably change shade" it is meant that they do not undergo a noteworthy change such as from red to blue. The pH sensitivity of the polymeric dye depends upon the sensitivity of the dye monomer. As a general rule, if the dye from which the dye monomer is derived is pH insensitive, the dye monomer will also be pH insensitive. On the other hand, if the dye is pH sensitive, then the dye monomer may be sensitive or not, depending upon whether addition of the methacryloyl group improves the pH sensitivity of the dye. Sensitivity to pH is easily determined by dissolving the dye monomer or polymer in water and changing the pH.

The formation or disappearance of precipitate does not, by itself, indicate shade sensitivity. Most of the dye monomers which are useful in the polymeric dyes of this invention are not shade sensitive to pH.

Shade insensitivity to pH is important since the polymeric dyes are isolated under acidic conditions and then applied to the fibers at a pH above 7. Once on the fibers, the dyes may again be subjected to acidic conditions. Thus, if the polymeric dye is sensitive to pH changes, the share of the dye does not remain constant and its usefulness for identifying the fibers is somewhat limited. Such a polymer can however be used when neither of its shades is the same as those of other fugitive dyes used in the same textile operation.

The polymeric dyes of this invention are derived at least about 30% by weight from an alkyl methacrylate ester. Since these polymers are required to be derived at least about 5.5% from other monomers (dye monomer plus methacrylic acid), the maximum permissible amount of alkyl methacrylate is about 94.5%. Preferably the polymeric dyes are derived about 50 to 80% from the ester.

The choice of alkyl methacrylate will depend to some extent on the properties desired in the polymer. It is well known, for example, that polymers of the lower-alkyl methacrylates, such as the methyl or ethyl esters, and higher-alkyl methacrylates, such as the hexadecyl or octadecyl esters, have higher glass transition temperatures than those containing alkyl groups having an intermediate number of carbon atoms. Alkyl methacrylates containing alkyl groups of 10 to 14 carbon atoms have the minimum glass transition temperatures. Thus, if more elastic polymers are required to accommodate conditions encountered during use of the polymeric dyes, the medium molecular weight methacrylate esters or mixtures thereof might be preferable. In those cases where the glass transition temperature has little or no significance, that is where elasticity versus possible brittleness is not of importance, lower-alkyl methacrylates, particularly the methyl, ethyl, propyl and the isomeric butyl esters, are preferred based on economic considerations.

Useful polymeric dyes may, of course, be prepared from any alkyl methacrylate containing from one to 18 carbons in the alkyl group. Many of these esters, for example the lower-alkyl methacrylates mentioned above as well as the octyl, 2-ethylhexyl, decyl, lauryl and stearyl esters, are presently commercially available.

The polymeric dyes of this invention are also derived about 5 to 60% by weight from methacrylic acid or a water-soluble salt thereof. Suitable salts include alkali metal, ammonium and substituted ammonium salts derived from water-soluble amines. Typical amines include, for example, alkyl amines such as mono-, di- and tri-methylamines and the corresponding ethyl amines, pyridine, morpholine, alkanol amines such as mono-, di- and triethanolamine, methyldiethanolamine and propanolamine, and the like. Usually, the amine salts and particularly the ammonium salt are preferred.

The polymeric dyes of this invention must be derived at least about 5% by weight from methacrylic acid or salt to insure at least about 5% solubility at a pH greater than 7. This solubility facilitates application of the polymeric dye to the fibers from an alkaline bath. About 60% methacrylic acid is the maximum useful amount. The upper limit on the amount of methacrylic acid or salt is dictated by the requirement that the polymer be less than about 1% water soluble at a pH of 3. Generally, not more than about 50% methacrylic acid will be used since processing problems are commonly encountered with the resulting polymers containing more than this amount. Preferably the polymeric dye contains about 10 to 45% methacrylic acid.

The present invention also contemplates inclusion in the polymeric dye of small amounts up to about 15% of other herein unnamed monomers, provided the required properties of the polymers are not changed thereby.

The polymeric dyes of this invention are derived about 0.5 to 50% by weight from dye monomer. At least 0.5% dye monomer is generally required to impart to the polymer sufficient color or tinctorial strength that it can be readily seen when applied to fiber. In most cases, about 2 to 15% is preferred. Higher amounts of dye monomer up to about 50% may be used, but these amounts produce no useful effect over polymers containing about 15% and such higher amounts increase the cost of the resulting polymeric dye. In addition, the effect of such higher concentrations on polymer solubility at pH 3 may be adverse in some cases.

The dye monomers used in this invention must contain at least one sulfonic acid group, —$SO_3H$, or a water-soluble salt thereof. Suitable water-soluble salts include those described earlier with respect to methacrylic acid salts. The preferred dye monomers contain two or more, for example two to four, sulfonic acid groups or salts thereof.

As indicated earlier, the dye monomer must be at least ten times more soluble in water at pH 3 than the polymeric dye prepared from it. The solubility of the dye monomer at pH 3 is controlled to some extent by the presence of one or more sulfo groups. The solubility of the polymer at pH 3 is dependent on the composition of the polymer. The amounts of methacrylic acid and dye monomer relative to each other, as well as to the alkyl methacrylate monomer, control water solubility of the polymer. Usually, if a polymer is more than one-tenth as soluble as the monomer, increasing the relative amount of alkyl methacrylate or the size of the alkyl group will decrease its solubility. Dye monomers which are incapable of producing polymers having solubility of at least 5% at a pH greater than 7, and less than 1% and no more than one-tenth that of the dye monomer at a pH of 3, are not useful in the present invention. Such deficiency is usually due to low dye monomer solubility.

Insofar as is presently known, dye monomers containing two or more sulfo groups are capable of meeting the requirements set out above without exception. Such dye monomers are generally preferred. Many dye monomers containing a single sulfo group are also capable of meeting these requirements, but not all. For example, polyazo dye monomers containing several rings and only one sulfo group generally are not useful. When the dye monomer contains two or more sulfo groups the relative concentration of the dye monomer in the polymer must be limited so that the maximum permissible solubility of the polymer at pH 3 is not exceeded, as earlier indicated.

The dye monomers used in accordance with this invention are the formula DX—COC($CH_3$)=$CH_2$ in which DX— is a dye residue derived from azo, anthraquinone or methine dye of the formula DX—H where in X is

where R is hydrogen or lower-alkyl, preferably containing 1 to 4 carbon atoms, and the dye contains at least one sulfonic acid group or water-soluble salt thereof. In other words, the dye must contain a hydroxyl, primary amino or secondary amino group through which the methacryloyl group is attached. The dye monomers are thus either methacrylic acid esters or methacrylamides. The dye residue is that portion of the dye molecule which remains after removal of a hydrogen atom from the hydroxy or amino group.

Any azo, anthraquinone or methine dye residue having the necessary oxygen or nitrogen atom and sulfo group as indicated above may be used, its exact structure otherwise not being critical to the present invention. In suitable azo and anthraquinone dyes the hydroxy or amino group may be attached directly to the aryl moiety of the dye or, particularly where some steric hindrance may be present, through a connecting group such as

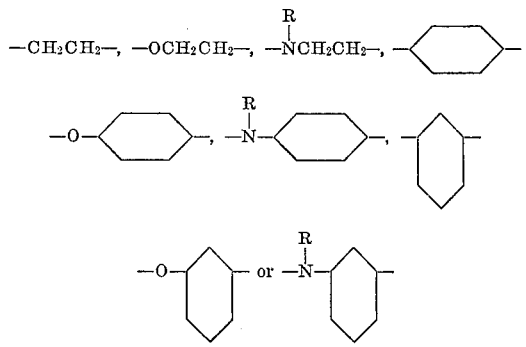

Many dyes of the formula DX—H are known in the art. Suitable azo dyes are prepared by coupling a diazo component such as a diazotized aromatic mono- or diamine to one or more coupling components. Useful coupling components include aromatic hydroxy compounds such as phenols and naphthols and especially amino naphthols, and aromatic amines such as N-hydroxyethyltoluidines. Both mono- and poly-azo dyes may be used herein.

Many aromatic compounds are known containing one or more sulfo groups which will form useful azo dyes for preparing the dye monomers of this invention. Examples of such are the aniline mono- and poly-sulfonic acids, amino G acid, amino J acid, C acid, amino Epsilon acid, 4-amino-1,5-naphthalene-disulfonic acid, naphthionic acid and isomers, the five Cleve's acids, D acid, Peri acid, A acid, B acid, Chicago acid, Dahl's acids II, III and IV, Freund's acid, G acid, Gamma acid, H acid, chloro H acid, J acid, K acid, L acid, M acid, R acid, Epsilon acid, RR acid, S acid, Schaeffer's acid, Tobias acid and similar hydroxy-, amino-, and hydroxyamino-mono- and -poly-benzene and -naphthalene sulfonic acids. These acids may be coupled with a wide variety of other components, both diazo and coupling components, to form useful azo dye intermediates for this invention.

A number of useful anthraquinone sulfonic acid dyes are also known which can be converted to dye monomers suitable for use in accordance with this invention. For example 1 - amino - 4 - (4' - aminophenyl)aminoanthraquinone - 2 - sulfonic acid, 1 - amino - 4 - N - (4'aminophenyl - N' ethanol) - aminoanthraquinone - 2 - sulfonic acid, 1 - amino - 4 - N - (4' - hydroxyphenyl)aminoanthraquinone - 2 - sulfonic acid, and 1 - amino - 4 - N - 4'- phenoxyethanol)aminoanthraquinone - 2 - sulfonic acid are useful. A number of methine dyes containing sulfonic acid groups are also known in the art which can be converted to suitable methacryloyl derivatives.

There are a vast number of useful azo, anthraquinone and methine dyes containing a hydroxyl, primary amino or secondary amino group and one or more sulfo groups known in the art, as listed in the Colour Index and elsewhere. There is no intention to limit the dye monomers of this invention to any particular group other than as specifically indicated, but rather to include any azo, anthraquinone or methine dye in the form of a methacrylic acid derivative which contains one or more sulfo groups and meets the solubility requirements of this invention.

The dye monomers are prepared by converting the above dyes to the methacryloyl derivatives through a hydroxy or amino group to form the ester or amide. When the dye molecule contains a free hydroxy or amino group, the dye may be condensed with methacryloyl chloride in the presence of aqueous alkali in accordance with the well-known Schotten-Bauman reaction or with a methacrylic acid ester, for example methyl methacrylate. Occasionally, and particularly if the molecule is somewhat hindered where the methacryloyl group would otherwise be attached to the dye molecule, it is preferable to have a connecting group between the dye molecule and the methacryloyl group. Such groups are available on many known dyes. If it is desired to insert a connecting group between the dye molecule and the methacryloyl group, this is readily accomplished by a number of known means, one being to react the dye molecule with an alkylene oxide such as ethylene or propylene oxide to form the hydroxyalkyl derivative which is then converted to the methacryloyl derivative.

Azo dye monomers may be prepared by converting azo dyes to their methacryloyl derivatives or by converting one of the coupling components to its methacryloyl derivative before coupling. For example, any of the above named sulfonic acid coupling components may be converted to its methacryloyl derivative before coupling to form the azo compound.

Preferred azo dye monomers include those of the formulae:

(I) 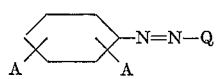

in which each A is H, $SO_3H$, a water-soluble salt of $SO_3H$, $NO_2$, Cl or $CH_3$, Q is

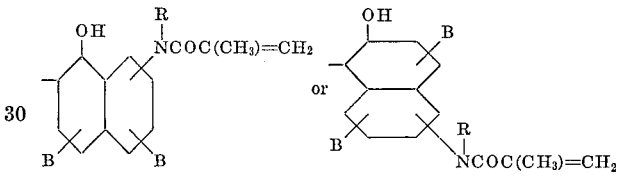

wherein each B is H, $SO_3H$, or a water-soluble salt of $SO_3H$ and R is H or lower-alkyl, and at least one of the A's or B's is $SO_3H$ or a water-soluble salt thereof, (II) 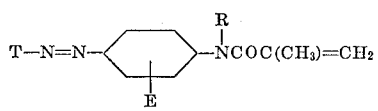

in which R is as described before, E is H, $CH_3$, $OCH_3$ or $NHCOCH_3$, and T is

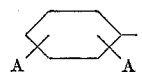

wherein A is as described before, and at least one A is $SO_3H$ or a water-soluble salt thereof, or

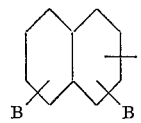

wherein B is as described before and at least one B is $SO_3H$ or a water-soluble salt thereof, (III) 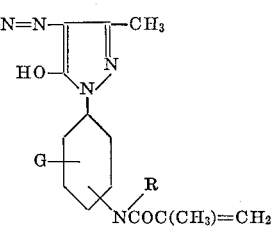

in which R is as described before, G is H, $CH_3$ or Cl, and U is

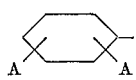

wherein A is as described before, and at least one A is SO₃H or a water-soluble salt thereof, or

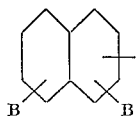

wherein B is as described before, and at least one B is SO₃H or a water-soluble salt thereof, (IV)
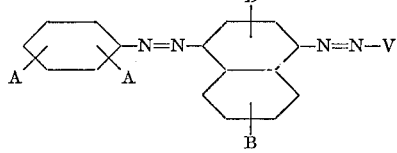

in which A and B are as described before, V is

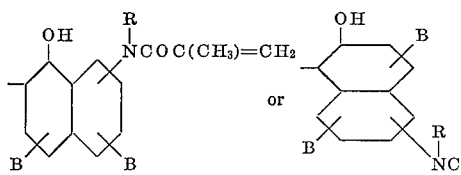

wherein R is as described before, and at least two of the A's and B's are SO₃H or a water-soluble salt thereof, (V)
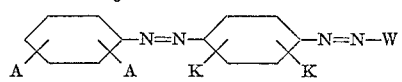

in which A is as described before, each K is H, CH₃ or OCH₃, W is

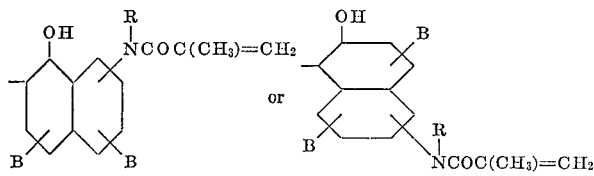

wherein B and R are as described before, and at least two of the A's and B's are SO₃H or a water-soluble salt thereof, and (VI)
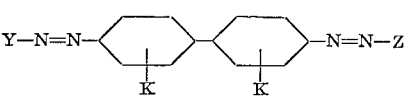

in which K is as described before, Y is

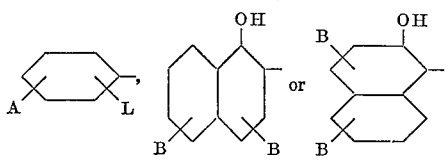

and Z is

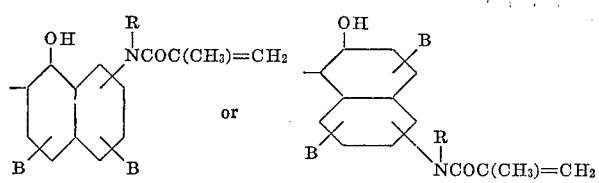

wherein A, B and R are as described before, L is NH₂, OH or OCH₃, and at least two of the A's and B's are SO₃H or a water-soluble salt thereof. All of the azo dye monomers of the above formulae are shade insensitive to pH changes in the range of 3 to 10.

As has been specified above, all monomers required to prepare the polymers of this invention are methacrylic acid or a derivative thereof. In general, acrylic acid and the corresponding derivatives are not suitable; polymeric dyes based primarily on these monomers stain several types of fibers rather badly. However, small amounts of acrylic acid and/or alkyl acrylate esters up to about 10% can be tolerated in polymers based primarily on methacrylic acid.

The polymeric dyes of this invention may be prepared by any convenient means known in the art for polymerizing methacrylic acid and derivatives. Due to the generally solid nature of the dye monomers in particular, polymerization by solution, dispersion or emulsion techniques is preferred. Water-alcohol mixtures are often suitable polymerization media since the monomers are generally more soluble in these mixtures.

Free radical initiated polymerizations are generally preferred for preparing the subject polymers. Suitable initiators are the alkali metal or ammonium persulfates, the well known redox systems, water-soluble peroxides such as hydrogen peroxide and the aliphatic azo compounds such as azobis-isobutyronitrile, azobis-isobutyramidine dihydrochloride and analogous compounds. Organic peroxides including benzoyl peroxide, lauroyl peroxide, di(tert.-butyl) peroxide, dicumyl peroxide, cyclohexane peroxide, methyl ethyl ketone peroxide, succinic acid peroxide and 2,5 - dimethyl-2,5 - di-tert.-butyl-peroxyhexane; hydroperoxides such as tert.-butyl hydroperoxide, cumene hydroperoxide, paramenthane hydroperoxide, pinane hydroperoxide, and 2,5-dimethylhexane-2,5 - dihydroperoxide; peroxy esters such as tert. - butyl perbenzoate, di(tert. - butyl) diperphthalate, tert. - butyl peracetate, tert.-butyl perpivalate and isopropyl percarbonate may be used if they are sufficiently soluble in the reaction medium. It is not absolutely necessary that the initiator be soluble in the reaction medium, but it is preferable that such be the case. Other means of initiating free radical polymerizations may also be used. These include actinic or ionizing radiation.

The polymerization reaction is carried to as near completion as possible. The molecular weight of the polymeric dye is not important provided it is sufficient to provdie solid, non-tacky polymers. When typical free radical initiated polymerization systems are used there is no problem in this respect. In general, inherent viscosities of the polymer as 0.5% solutions in dimethylformamide at 30° C. will exceed about 0.1 where inherent viscosity is defined by the formula $$\frac{1}{C} \ln\left(\frac{n}{n_0}\right)$$

in which C is the concentration in grams per 100 cc. of solution, $n$ is the viscosity of the polymer solution, $n_0$ is the viscosity of the solvent and $ln$ is the natural logarithm.

After completion of the polymerization reaction, the crude polymer is isolated. When the polymerization is carried out in an aqueous medium this is readily accomplished by adding sufficient ammonia to bring the pH well above 7, drowning in water, then adding sufficient mineral acid to bring the pH well below 7, thereby causing the polymer to pecipitate while the unreacted dye monomer remains in solution. The crude polymer is purified by redissolving in water at a pH above 7, acidifying with mineral acid and collecting the polymer by filtration. One such reprecipitation is generally sufficient to remove all absorbed unreacted monomer, although it may be repeated several times if so desired. The polymer is then washed with water to remove adhering acid and dissolved inorganic salts.

The polymeric fugitive dyes of this invention may be applied to fibers or fabrics in any conventional manner for dye application from an aqueous bath which does not require heating to temperatures over about 240° F. Useful methods include dipping, spraying, padding and the like. The polymers are applied from aqueous medium at a pH greater than 7, for example from dilute aqueous ammonia. The polymer should be completely dissolved in the medium. After application, the excess solution is removed by squeezing or the like and the fiber or fabric is dried by conventional means, again not involving temperatures above about 240° F.

The polymer concentration in the dye solution should be sufficient to color the fibers for recognition purposes. Although the concentration required will depend to some extent on the tinctorial strength of the polymeric dye, in most cases, about 1 to 10% solutions are suitable.

Fibers which have been dyed with the polymeric dyes of this invention may be subjected to the usual textile processing steps, including acid treatment, without loss of color.

The maximum water solubility of these dyes of less than 1% at a pH of 3 is also important in their use since fibers colored with them are often subjected to acidic conditions such as in acid slashing operations.

When fibers which have been dyed with the polymeric dyes of this invention no longer require color for identification purposes, and certainly before dyeing to permanent shades, the fugitive dyes are removed. Scouring in a mildly alkaline system is usually sufficient to remove the fugitive dyes although any other convenient means may be used. A pH greater than 7 is preferable since the fugitive dyes are more soluble under such conditions. The use of commercially available detergents, for example oleate soap scours, generally removes the fugitive dyes completely.

The following examples, illustrating the preparation and use of typical fugitive dyes within the scope of this invention, are given without any intention that the invention be limited thereto. Since most sulfonic acids are isolated as sodium salts, the sulfonic acids used in the following examples are usually in the form of their sodium salts as indicated. All parts and percentages are by weight.

EXAMPLE 1

(A) A methacryloyl azo coupling component is prepared as follows: A solution of 0.2 mole of the disodium salt of H acid (8-amino-1-naphthol-3,6-disulfonic acid) in 1000 parts of water is adjusted to pH 7 with 2 N sodium hydroxide. After cooling the solution in an ice-bath, 30 parts methacryloyl chloride are added dropwise over a two hour period while maintaining the temperature at 0° to 5° C. and pH in the range of 5 to 7 with periodic addition of 2 N sodium hydroxide. The resulting product solution is not isolated but rather used directly below.

(B) An azo dye monomer is prepared as follows: Aniline (18.6 parts) is diazotized according to the procedure described in Fierz-David and Blangey, Fundamental Processes of Dye Chemistry, 5th Austrian ed., p. 243 of translation by P. W. Vittum (1949), Interscience Publishers, Inc. (John Wiley and Sons, Inc.). The resulting solution of the benzene diazonium salt is added over a period of one hour to the coupling component solution prepared above, while maintaining the temperature at 5°±5° C., keeping the mixture alkaline by addition of about 75 parts of sodium carbonate. The dye monomer is precipitated by acidification with mineral acid, collected by filtration, washed with a 10% sodium chloride solution and oven dried. The yield is 126 parts of a red dye monomer, about 75% pure, of the structure:

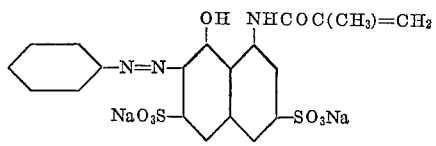

Analysis for $C_{20}H_{15}O_8S_2N_2$:

| Element | Calcd. | Found | Percent purity |
|---|---|---|---|
| C | 44.87 | 33.6, 33.8 | 74.9, 75.4 |
| H | 2.82 | 2.2, 2.5 | |
| S | 11.96 | 8.9, 8.9 | 74.5, 74.5 |

Visible spectrum: absorptivity at 506 mμ is 44.3.

(C) A polymeric azo dye is prepared as follows: A mixture of 63 parts of methacrylic acid, 261 parts of n-butylmethacrylate and 17.5 parts of the dye monomer prepared above is combined with 1100 parts of isopropanol and 900 parts of deoxygenated water and heated to 80° C. with agitation. Then 3.2 parts of α,α′-azobis(isobutyronitrile) is added, and during the next two hours, 63 parts of methacrylic acid. Heating is continued for 20 hours. The reaction mass is cooled to 25° C. and 112 parts of 28% aqueous ammonia are added. The resulting mass is poured into about 4000 parts of water and 900 parts of 2 N HCl are added. The precipitated polymer is collected by filtration, then redissolved in 4000 parts of water containing 00 parts of 28% aqueous ammonia. The polymer is reprecipitated by addition of 1000 parts of 2 N HCl to a final pH of 2. The product is collected by filtration, washed with 1000 parts of hot water and dried in an oven to yield 328 parts of red powder.

The polymer has an absorptivity of 1.64 at 510 mμ as a dilute ammonium hydroxide solution. Based on the absorptivity of the monomer, the polymer contains 2.8% combined dye monomer. The acid number is determined to be 248 and 253, indicating 38.0 and 38.8% methacrylic acid for an average of 38.4%; therefore n-butyl methacrylate by difference is 58.8%.

(D) The fugitivity of the dye is determined as follows: The polymtric red dye is dissolved in dilute aqueous ammonia and padded onto multi-fiber No. 4 swatches and dried. The multi-fiber swatches are woven in strips about ¼ inch wide, both warp and woof, from each of 13 different fibers, allowing identical conditions to be used on all fibers for comparison. The fibers are (1) acetate rayon, (2) Acrilan, acrylic, (3) Arnel, triacetate, (4) cotton, (5) Creslan, acrylic, (6) Dacron, polyester, (7) Dynel, modacrylic, (8) Nylon-66, (9) Orlon, acrylic, (10) silk, (11) viscose rayon, (12) wool and (13) Zefran, acrylic. In separate tests, Nylon-6 is shown to behave in a manner analogous to Nylon-66.

All of the 13 different fibers in the multi-fiber No. 4 swatches are tinted red. The swatches are then scoured in 0.25% oleate soap solution at either 160° F. or at boil. The dye is essentially completely removed from all of the fibers.

If the multi-fiber swatch is steamed at 220° F. before scouring, the dye is still fugitive.

EXAMPLE 2

The polymerization of Example 1(C) is repeated using 5.1% of the red dye monomer of Example 1(B), 30.9% of methacrylic acid and 64% of various alkyl methacrylate esters. The polymers had the following absorptivities at 510 mμ in dilute aqueous ammonia.

| Polymer | $CH_2=C(CH_3)CO_2R, R=$ | Absorptivity |
|---|---|---|
| I | $CH_3$ | 2.12 |
| II | $n-C_8H_{17}$ | 2.61 |
| III | $n-C_2H_5$ | 2.22 |
| IV | $n-C_6H_{13}$ | 1.55 |

When these four polymers are padded from dilute aqueous ammonia to multi-fiber No. 4 swatches, no differences in behavior can be detected among themselves or when compared to the polymer of Example 1(C) using n-butyl methacrylate. The nature of the alcohol group in the methacrylate ester appears to have no effect on the behavior of the polymeric dye.

EXAMPLE 3

Following the procedure of Example 1(B), an azo dye monomer is prepared by diazotizing 17.3 parts of metanilic acid and coupling the resulting diazonium salt with a methacryloyl coupling component solution prepared by the reaction of 45 parts of the disodium salt of H acid with 18 parts of methacryloyl chloride following the procedure of Example 1(A) to give a red dye monomer of the structure:

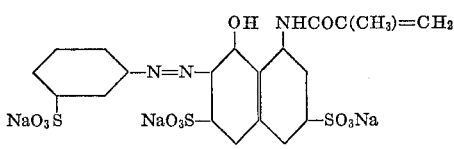

A polymeric red azo dye is prepared from 12.6 parts methacrylic acid, 26.1 parts methyl methacrylate and 3.0 parts of the above dye monomer following the procedure of Example 1(C). When tested for fugitiveness as described in Example 1(D), the resulting polymer behaves in a manner quite similar to the polymeric dye of Example 1(C).

EXAMPLE 4

Example 3 may be repeated using an equal molar amount of p-toluidine in place of metanilic acid to give a red azo dye monomer of the structure:

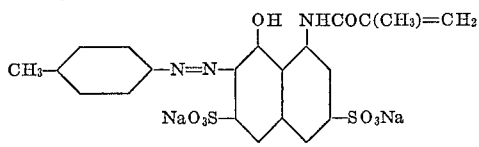

A fugitive polymeric ado dye may be prepared using an equal molar amount of the above dye monomer in place of the dye monomer of Example 3.

EXAMPLE 5

Example 3 may be repeated using an equal molar amount of cresidine in place of metanilic acid to give a red azo dye monomer of the structure:

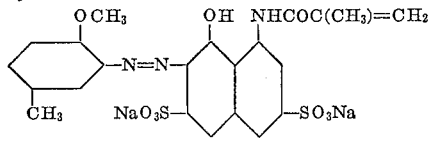

A fugitive polymeric azo dye may be prepared using an equal molar amount of the above dye monomer in place of the dye monomer of Example 3.

EXAMPLE 6

Example 3 may be repeated using a methacryloyl coupling component prepared by the procedure of Example 1(A) except that the disodium salt of B acid (8-amino-1-naphthol-4,6-disulfonic acid) is used in place of H acid salt to give a red azo dye monomer of the structure:

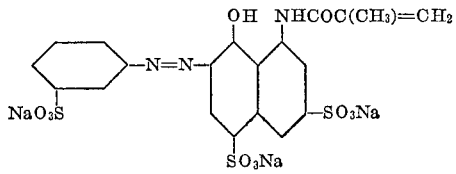

A fugitive polymeric azo dye may be prepared using the above dye monomer in place of the dye monomer of Example 3.

EXAMPLE 7

Example 3 may be repeated using a methacryloyl coupling component prepared by the procedure of Example 1(A) except that the disodium salt of Chicago acid (8-amino-1-naphthol-5,7-disulfonic acid) is used in place of H acid salt to give a red azo dye monomer of the structure:

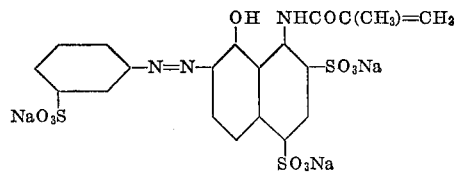

A fugitive polymeric azo dye may be prepared using the above dye monomer in place of the dye monomer of Example 3.

EXAMPLE 8

Example 3 may be repeated using a methacryloyl coupling component prepared by the procedure of Example 1(A) except that the disodium salt of K acid (8-amino-1-naphthol-3,5-disulfonic acid) is used in place of H acid salt to give a red azo dye monomer of the structure:

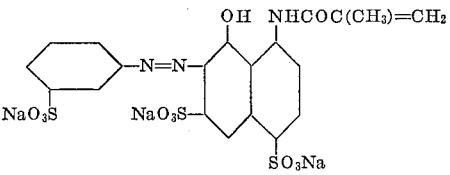

A fugitive polymeric azo dye may be prepared using the above dye monomer in place of the dye monomer of Example 3.

EXAMPLE 9

Example 3 may be repeated using a methacryloyl coupling component prepared by the procedure of Example 1(A) except that the disodium salt of RR acid (7-amino-1-naphthol-3,6-disulfonic acid) is used in place of H acid to give a red azo dye monomer of the structure:

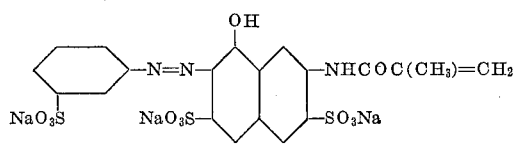

A fugitive azo dye may be prepared using the above dye monomer in place of the dye monomer of Example 3.

EXAMPLE 10

Using the procedure of Example 1(B), an azo dye monomer may be prepared by diazotizing aniline and coupling the resulting diazonium salt with a methacryloyl coupling component prepared by the procedure of Example 1(A) except that the disodium salt of 7-amino-2-naphthol-3,6-disulfonic acid is used in place of H acid salt to give a red dye monomer of the structure:

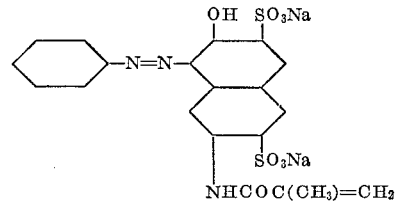

A fugitive polymeric dye may be prepared by the procedure of Example 1(C) using the above dye monomer in place of the dye monomer of that example.

EXAMPLE 11

Using the procedure of Example 1(B), an azo dye monomer may be prepared by diazotizing metanilic acid and coupling the resulting diazonium salt with a methacryloyl coupling component prepared by the procedure of Example 1(A) except that the disodium salt of 5-amino-2-naphthol-3,7-disulfonic acid is used in place of H acid salt to give a red dye monomer of the structure:

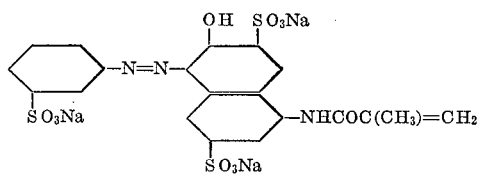

A fugitive polymeric dye may be prepared by the procedure of Example 1(C) using the above dye monomer in place of the dye monomer of that example.

EXAMPLE 12

Using the procedure of Example 1(B), an azo dye monomer may be prepared by diazotizing the sodium salt of orthanilic acid and coupling and resulting diazonium salt with a methacryloyl coupling component prepared by the procedure of Example 1(A) except that the sodium salt of 8-amino-2-naphthol-6-sulfonic acid is used in place of H acid salt to give a red dye monomer of the structure:

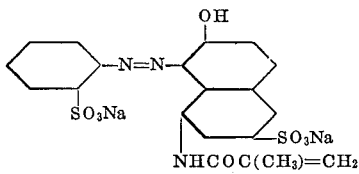

A fugitive polymeric dye may be prepared by the procedure of Example 1(C) using the above dye monomer in place of the dye monomer in that example.

EXAMPLE 13

Using the procedure of Example 1(B), an azo dye monomer may be prepared by diazotizing the sodium salt of 4-nitroaniline-2-sulfonic acid and coupling the resulting diazonium salt with a methacryloyl coupling component prepared by the procedure of Example 1(A) except that the sodium salt of 7-amino-2-naphthol-3-sulfonic acid is used in place of H acid salt to give a red dye monomer of the structure:

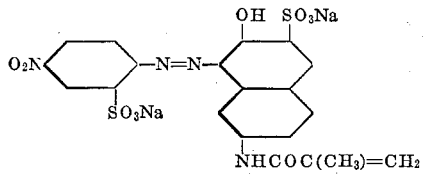

A fugitive polymeric dye may be prepared by the procedure of Example 1(C) using the above dye monomer in place of the dye monomer of that example.

EXAMPLE 14

Using the procedure of Example 1(B), an azo dye monomer may be prepared by diazotizing 4-chloro-o-toluidine and coupling the resulting diazonium salt with a methacryloyl coupling component prepared by the procedure of Example 1(A) except that the disodium salt of 7-amino-2-naphthol-3,6-disulfonic acid is used in place of H acid salt to give a red dye monomer of the structure:

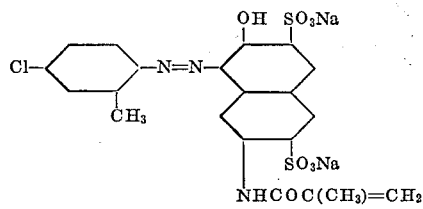

A fugitive polymeric dye may be prepared by the procedure of Example 1(C) using the above dye monomer in place of the dye monomer of that example.

EXAMPLE 15

Using the procedure of Example 1(B), an azo dye monomer may be prepared by diazotizing 3,5-xylidine and coupling the resulting diazonium salt with a methacryloyl coupling component prepared by the procedure of Example 1(A) except that the disodium salt of 5-amino-2-naphthol-3,7-disulfonic acid is used in place of H acid salt to give a red dye monomer of the structure:

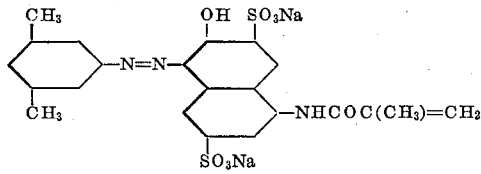

A fugitive polymeric dye may be prepared by the procedure of Example 1(C) using the above dye monomer in place of the dye monomer of that example.

EXAMPLE 16

(A) Aminothiazole sulfonic acid is prepared as follows: A mixture of 250 parts of 2-aminothiazole, 707 parts of water and 236 parts of 98% sulfuric acid is heated for 45 minutes with agitation at 110–120° C. The hot reaction mass is poured onto 2500 parts of ice. The precipitated 2-aminothiazol-5-sulfonic acid is collected by filtration, washed with 500 parts of 5% hydrochloric acid and dried.

(B) An azo dye is prepared as follows: The diazonium salt of 2-aminothiazol-5-sulfonic acid is prepared by adding 29.6 parts of the amine to a solution of 294 parts of 98% sulfuric acid, 11 parts of sodium nitrite and 270 parts of phosphoric acid over a twenty minute period at less than 10° C. The solution is then agitated for 45 minutes at —5° C. This solution of the diazonium salt is then added to a solution of 28.6 parts N-ethyl-N-(2'-hydroxyethyl)-m-toluidine, 384 parts of water and 27.5 parts of 98% sulfuric acid at —5° C. After 20 minutes at 5° C., the mass is diluted to 1500 volumes with water and the precipitated product is collected by filtration. The product is washed with 1500 parts of 25% aqueous sodium chloride and dried. Analysis indicates that the product contains 7% NaCl and 93% of a red azo dye of the structure:

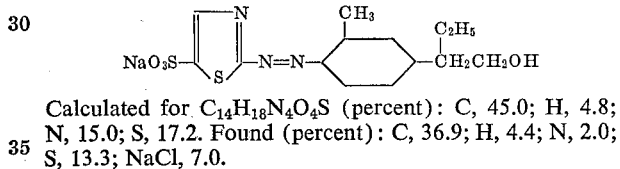

Calculated for $C_{14}H_{18}N_4O_4S$ (percent): C, 45.0; H, 4.8; N, 15.0; S, 17.2. Found (percent): C, 36.9; H, 4.4; N, 2.0; S, 13.3; NaCl, 7.0.

(C) An azo dye monomer is prepared as follows: A mixture of 258 parts of the above azo dye, 1290 parts of dimethylacetamide, 252 parts of triethylamine and 80.5 parts of methacryloyl chloride is stirred for 20 hours at room temperature. The mixture is then heated for 5 minutes at 80° C. and filtered to remove triethylamine hydrochloride. Evaporation of the filtrate to dryness at reduced pressure gives a red monomer of the structure:

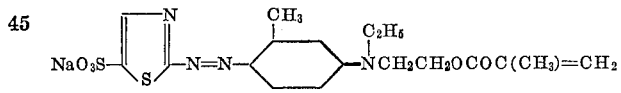

(D) The polymerization of Example 1(C) is repeated using 1% of the above dye monomer, 84% of butyl methacrylate and 15% of methacrylic acid. When padded from dilute aqueous ammonia solution to multi-fiber No. 4 swatches, all fibers are colored red. Fugitivity on all fibers is satisfactory on scouring.

EXAMPLE 17

An azo dye is prepared by the procedure of Example 16(B) using 26.4 parts of N-ethyl-N-2'-hydroxyethylaniline in place of N-ethyl-N-(2'-hydroxyethyl)-m-toluidine to give a red azo dye of the structure:

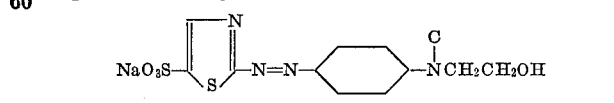

This azo dye may be reacted with methacryloyl chloride following the procedure of Example 16(C) to give a dye monomer of the structure:

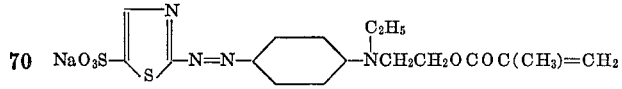

A fugitive polymeric dye may be prepared by the procedure of Example 16(D) using an equal molar amount of the above dye monomer in place of the dye monomer of that example.

EXAMPLE 18

Using the procedure of Example 1(B), 29.9 parts of the disodium salt of aniline-2,5-disulfonic acid is coupled to 17.3 parts of 1-(3'-aminophenyl)-3-methyl-5-pyrazolone. A 10-part portion of the resulting dye is then converted to the methacrylamine by treating with 4 parts of methacryloyl chloride using the procedure of Example 1(A) to give a yellow azo dye monomer of the structure:

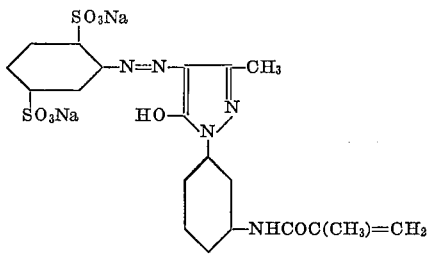

A polymeric azo dye is prepared by the polymerization procedure of Example 1(C) using 7.2% of the above dye monomer, 30.2% of methacrylic acid and 62.6% of methyl methacrylate. A yellow polymer having an absorptivity of 1.51 at 390 m$\mu$ in dilute aqueous ammonia is obtained.

Padding of this polymer on multi-fiber No. 4 swatches colors all fibers yellow. The dye is fugitive on all fibers when scoured as in Example 1(D).

EXAMPLE 19

Example 18 may be repeated using an equal molar amount of metanilic acid in place of aniline-2,5-disulfonic acid salt to give a yellow dye monomer of the structure:

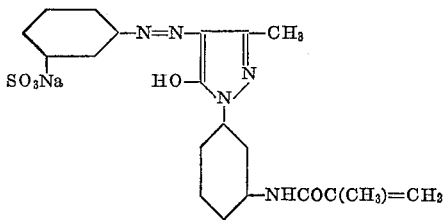

A fugitive polymeric dye may be prepared using an equal molar amount of the above dye monomer in place of the dye monomer of Example 18.

EXAMPLE 20

Example 18 may be repeated using the disodium salt of aniline-2,4-disulfonic acid in place of aniline-2,5-disulfonic acid salt and an equal molar amount of 1(3'-amino-5'-chlorophenyl)-3-methyl-5-pyrazolone in place of the unchlorinated pyrazolone to give a yellow azo dye monomer of the structure:

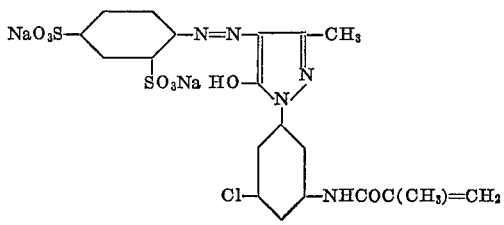

A fugitive polymeric dye may be prepared using an equal molar amount of the above dye monomer in place of the dye monomer of Example 18.

EXAMPLE 21

Example 18 may be repeated using an equal molar amount of the disodium salt of Amino G acid (7-amino-1,3-naphthalenedisulfonic acid) in place of aniline-2,5-disulfonic acid salt to give a yellow azo dye monomer of the structure:

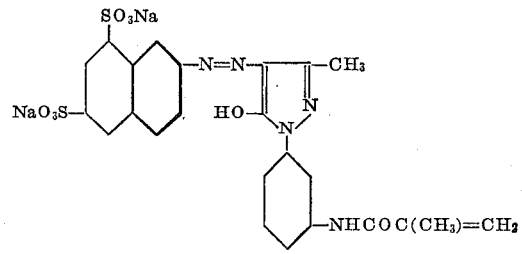

A fugitive polymeric dye may be prepared using an equal molar amount of the above dye monomer in place of the dye monomer of Example 18.

EXAMPLE 22

Using the procedure of Example 1(B), 15.3 parts of 2-(p-amino-phenoxy) ethanol is coupled with 21.4 parts of the sodium salt of Schaeffer's acid (2-naphthol-6-sulfonic acid) and the resulting dye is esterified with excess methacryloyl chloride using the procedure of Example 16(C) to give an orange azo dye monomer of the structure:

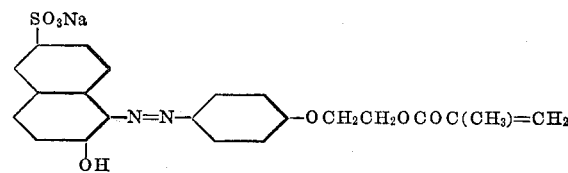

A fugitive polymeric dye may be prepared by the polymerization procedure of Example 1(C) using an equal molar amount of the above dye monomer in place of the dye monomer of that example.

EXAMPLE 23

Example 22 may be repeated using the sodium salt of F acid (2-naphthol-7-sulfonic acid) in place of Schaeffer's acid salt to give an orange azo dye monomer of the structure:

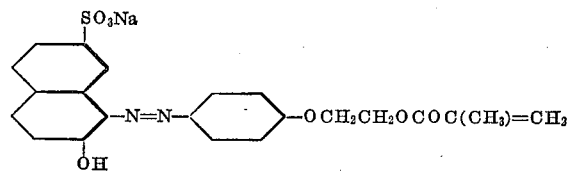

A fugitive polymeric dye may be prepared using the above dye monomer in place of the dye monomer of Example 22.

EXAMPLE 24

Example 22 may be repeated using the sodium salt of Crocein acid (2-naphthol-8-sulfonic acid) in place of Schaeffer's acid salt to give an orange azo dye monomer of the structure:

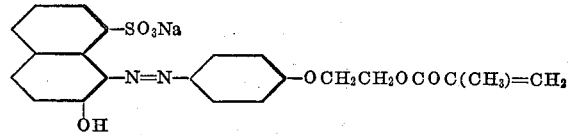

A fugitive polymeric dye may be prepared using the above dye monomer in place of the dye monomer of Example 22.

EXAMPLE 25

Example 22 is repeated using the sodium salt of Nevile and Winther's acid (1-naphthol-4-sulfonic acid) in place of Schaeffer's acid salt to give a red azo dye monomer of the structure:

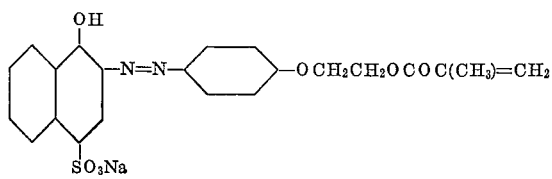

A fugitive polymeric dye may be prepared using the above dye monomer in place of the dye monomer of Example 22.

EXAMPLE 26

Example 22 may be repeated using the sodium salt of Armstrong and Wyme's acid (1-naphthol-3-sulfonic acid) in place of Schaeffer's acid salt to give a red azo dye monomer of the structure:

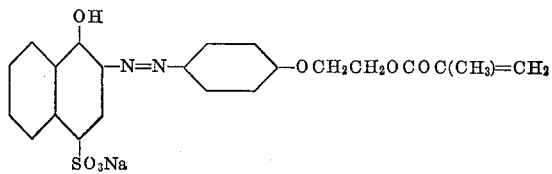

A fugitive polymeric dye may be prepared using the above dye monomer in place of the dye monomer of Example 22.

EXAMPLE 27

Example 22 may be repeated substituting the sodium salt of L-acid (1-naphthol-5-sulfonic acid) for Schaeffer's acid salt to give a red dye monomer of the structure:

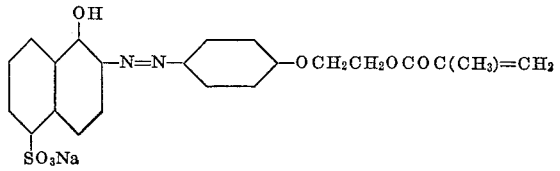

A fugitive polymeric dye may be prepared using the above dye monomer in place of the dye monomer of Example 22.

EXAMPLE 28

Example 22 is repeated using 30.3 parts of the sodium salt of N-acetyl Gamma acid (7-acetylamino-1-naphthol-3-sulfonic acid) in place of Schaeffer's acid salt to give a red azo dye monomer of the structure:

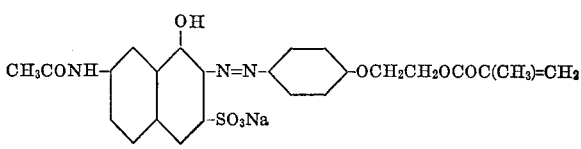

A fugitive polymeric dye may be prepared using an equal molar amount of the above dye monomer in place of the dye monomer of Example 22.

EXAMPLE 29

Example 22 may be repeated using 30.3 parts of the sodium salt of N-acetyl J acid (6-acetylamino-1-naphthol-3-sulfonic acid) in place of Schaeffer's acid salt to give a red azo dye monomer of the structure:

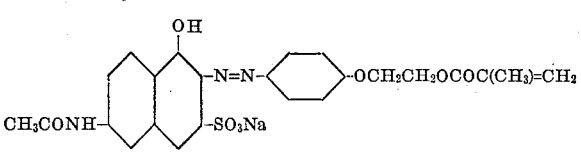

A fugitive polymeric dye may be prepared using an equal molar amount of the above dye monomer in place of the dye monomer of Example 22.

EXAMPLE 30

Example 22 may be repeated using 30.3 parts of the sodium salt of N-acetyl M acid (5-acetylamino-1-naphthol-3-sulfonic acid) in place of Schaeffer's acid salt to give a red dye monomer of the structure:

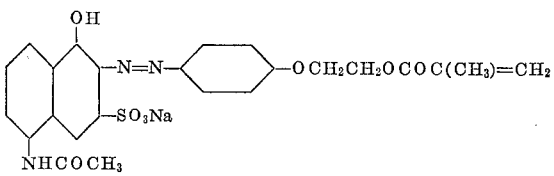

A fugitive polymeric dye may be prepared using an equal molar amount of the above dye monomer in place of the dye monomer of Example 22.

EXAMPLE 31

Example 22 may be repeated using 30.3 parts of the sodium salt of N-acetyl S acid (8-acetylamino-1-naphthol-5-sulfonic acid) in place of Schaeffer's acid salt to give a red azo dye monomer of the structure:

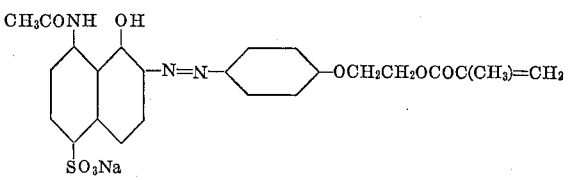

A fugitive polymeric dye may be prepared using an equal molar amount of the above dye monomer in place of the dye monomer of Example 22.

EXAMPLE 32

Example 22 is repeated substituting 33.7 parts of the sodium salt of N-phenyl Gamma acid (7-anilino-1-naphthol-3-sulfonic acid) for Schaeffer's acid salt to give a red-brown azo dye monomer of the structure:

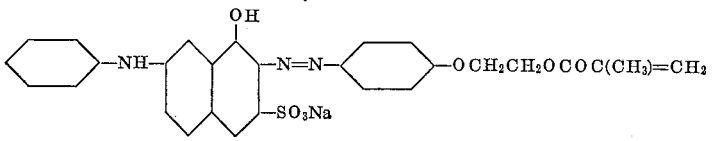

A fugitive polymeric dye may be prepared using an equal molar amount of the above dye monomer in place of the dye monomer of Example 22.

EXAMPLE 33

Using the procedure of Example 1(B), 18.2 parts of the sodium salt of 2-methylaniline-4-sulfonic acid is coupled to 10.2 parts of N-(2'-cyanoethyl)-N-(2'-hydroxyethyl)aniline and the resulting product is esterified with excess methacryloyl chloride using the procedure of Example 16(C) to give an orange-yellow azo dye monomer of the structure:

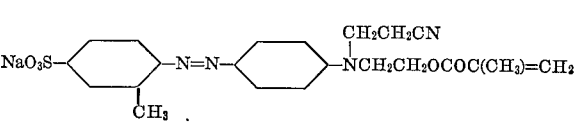

A fugitive polymeric dye may be prepared by the polymerization procedure of Example 1(C) using an equal molar amount of the above dye monomer in place of the dye monomer of that example.

EXAMPLE 34

Example 33 may be repeated using an equal molar amount of the sodium salt of sulfanilic acid (p-aminobenzenesulfonic acid) in place of 2-methylaniline-4-sulfonic acid salt to give an orange-yellow azo dye monomer of the structure:

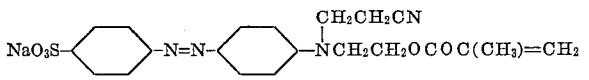

A fugitive polymeric dye may be prepared using an equal molar amount of the above dye monomer in place of the dye monomer of Example 33.

EXAMPLE 35

Example 33 may be repeated using the sodium salt of 3-methylaniline-4-sulfonic acid in place of 2-methylaniline-4-sulfonic acid salt to give an orange-yellow azo dye monomer of the structure:

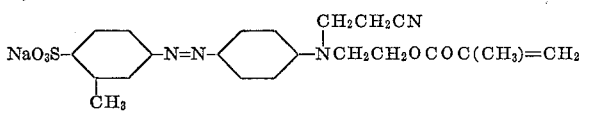

A fugitive polymeric dye may be prepared using the above dye monomer in place of the dye monomer of Example 33.

EXAMPLE 36

Example 33 may be repeated using the sodium salt of 4-methylaniline-3-sulfonic acid in place of 2-methylaniline-4-sulfonic acid salt to give an orange-yellow monomer of the structure:

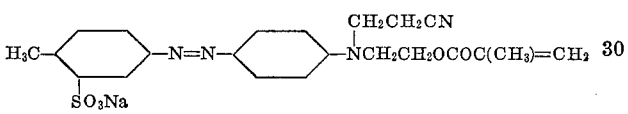

A fugitive polymeric dye may be prepared using the above dye monomer in place of the dye monomer of Example 33.

EXAMPLE 37

Example 33 is repeated substituting 20.9 parts of the sodium salt of 4-nitro-aniline-2-sulfonic acid for 2-methylaniline-4-sulfonic acid salt to give an orange-red azo dye monomer of the structure:

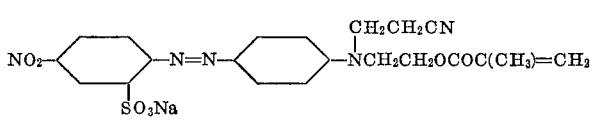

A fugitive polymeric dye may be prepared using an equal molar amount of the above dye monomer in place of the dye monomer of Example 33.

EXAMPLE 38

Using the procedure of Example 1(B), 10 parts of the sodium salt of 2-amino-benzthiazole-6-sulfonic acid is coupled to 7 parts of N-ethyl-N-(2'-hydroxyethyl)-3-methylaniline and the resulting dye is esterified with excess methacryloyl chloride using the procedure of Example 16(C) to give a red azo dye monomer of the structure:

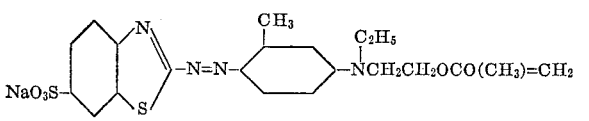

A fugitive polymeric dye may be prepared by the polymerization procedure of Example 1(C) using an equal molar amount of the above dye monomer in place of the dye monomer of that example.

EXAMPLE 39

Using the procedure of Example 1(B), 18.2 parts of the sodium salt of 4-nitroaniline-2-sulfonic acid is coupled to 10.2 parts of N-(2'-cyanoethyl)-N-(2'-hydroxyethyl)-3-methylaniline and the resulting product was esterified with excess methacryloyl chloride using the procedure of Example 16(C) to give an orange-red azo dye monomer of the structure:

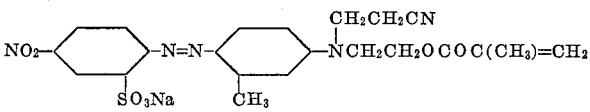

A fugitive polymeric dye may be prepared by the polymerization procedure of Example 1(C) using an equal molar amount of the above dye monomer in place of the dye monomer of that example.

EXAMPLE 40

Using the procedure of Example 1(B), 25 parts of 3-aminobenzyl alcohol is coupled with 67.4 parts of the disodium salt of R acid (2-naphthol-3,6-disulfonic acid) and the resulting dye is esterified with excess methacryloyl chloride by the procedure of Example 16(C) to give a red azo dye monomer of the structure:

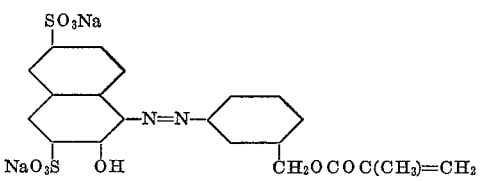

A fugitive polymeric dye may be prepared by the polymerization procedure of Example 1(C) using an equal molar amount of the above dye monomer in place of the dye monomer of that example.

EXAMPLE 41

Example 40 may be repeated using the disodium salt of G acid (2-naphthol-6,8-disulfonic acid) in place of R acid salt to give a red azo dye monomer of the structure:

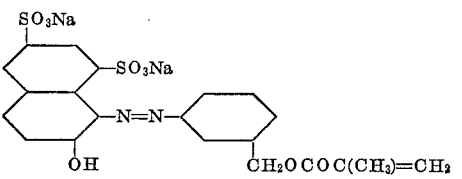

A fugitive polymeric dye may be prepared using the above dye monomer in place of the dye monomer of Example 40.

EXAMPLE 42

Example 40 may be repeated using the disodium salt of RG acid (1-naphthol-3,6-disulfonic acid) in place of R acid salt to give a red azo dye monomer of the structure:

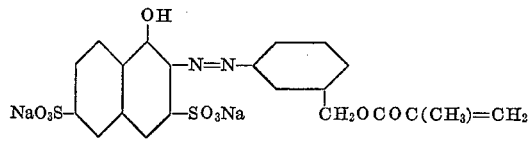

A fugitive polymeric dye may be prepared using the above dye monomer in place of the dye monomer of Example 30.

EXAMPLE 43

Example 40 may be repeated using the disodium salt of Andresen's acid (Epsilon acid, 1-naphthol-3,8-disulfonic acid) in place of R acid salt to give a red azo dye monomer of the structure:

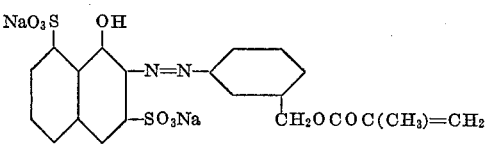

A fugitive polymeric dye may be prepared using the above dye monomer in place of the dye monomer of Example 40.

EXAMPLE 44

Using the procedure of Example 1(B), the disodium salt of aniline-2,4-disulfonic acid may be coupled to aniline and the resulting azoamine converted to the methacrylamide using the procedure of Example 1(A) to give a yellow azo dye monomer of the structure:

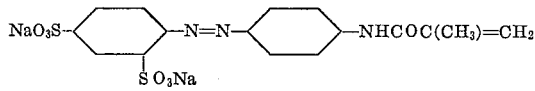

A fugitive polymeric dye may be prepared by the polymerization procedure of Example 1(C) using an equal molar amount of the above dye monomer in place of the dye monomer of that example.

EXAMPLE 45

Example 44 may be repeated using 2-methoxyaniline in place of aniline to give a yellow azo dye monomer of the structure:

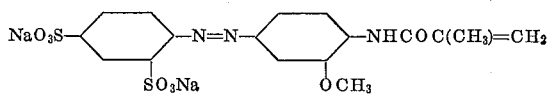

A fugitive polymeric dye may be prepared using an equal molar amount of the above dye monomer in place of the dye monomer of Example 44.

EXAMPLE 46

Using the procedure of Example 1(B), 34.7 parts of the disodium salt of C acid (2-aminonaphthalene-4,8-disulfonic acid) is coupled to 15.0 parts of N-acetyl metaphenylene diamine. Thirty parts of the resulting intermediate azoamine is then reacted with excess methacryloyl chloride using the procedure of Example 1(A) to give 23.6 parts of a yellow azo dye monomer of the structure:

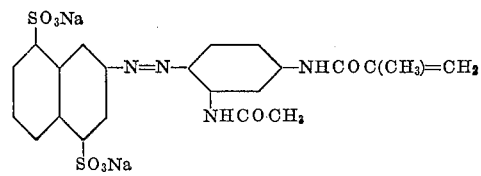

A fugitive polymeric dye is prepared by the polymerization procedure of Example 1(C) using 5.2% of the above dye monomer, 30.8% of methacrylic acid and 64.0% of methyl methacrylate. The resulting polymer has an asorptivity of 1.32 at 370 m$\mu$ in dilute aqueous ammonia.

This polymer is padded on a multi-fiber No. 4 swatch from dilute aqueous ammonia as in Example 1(D) thus coloring all fiber types yellow. Scouring removes the dye from all fiber types.

EXAMPLE 47

Example 46 may be repeated using an equal molar amount of the disodium salt of aniline-2,5-disulfonic acid in place of C acid salt to give a yellow azo dye monomer of the structure:

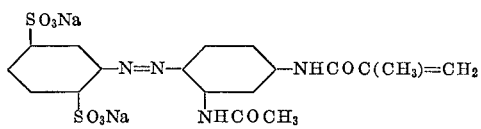

A fugitive polymeric dye may be prepared using an equal molar amount of the above dye monomer in place of the dye monomer of Example 46.

EXAMPLE 48

Using the procedure of Example 1(B), 34.7 parts of the disodium salt of amino G acid (2-aminonaphthalene-6,8-disulfonic acid) is coupled to 10.7 parts of meta-toluidine and 51.2 parts of the resulting azoamine is reacted with 12.0 parts of methacryloyl chloride by the procedure of Example 1(A) to give 42.9 parts of a yellow dye monomer of the structure:

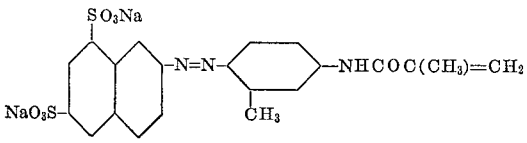

A polymeric yellow dye is prepared by the procedure of Example 1(C) using 2.8 parts of the above dye monomer, 12.6 parts of methacrylic acid and 26.1 parts of butyl methacrylate. The behavior of the resulting polymer as a fugitive dye is quite similar to the dye of Example 46.

EXAMPLE 49

Example 48 may be repeated using the disodium salt of amino J acid (6-aminonaphthalene-1,3-disulfonic acid) in place of amino G acid salt to give a yellow azo dye monomer of the structure:

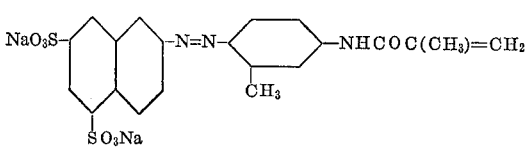

A fugitive polymeric dye may be prepared using the above dye monomer in place of the dye monomer of Example 48.

EXAMPLE 50

Example 48 may be repeated using the disodium salt of amino R acid (3-aminonaphthalene-2,7-disulfonic acid) in place of amino G acid salt to give a yellow azo dye monomer of the structure:

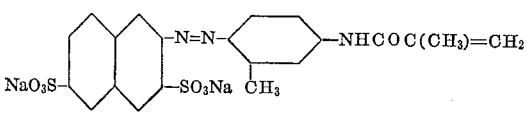

A fugative polymeric dye may be prepared using the above dye monomer in place of the dye monomer of Example 48.

EXAMPLE 51

Example 48 may be repeated using the disodium salt of amino Epsilon acid (8-aminonaphthalene-1,6-disulfonic acid) in place of amino G acid salt to give a yellow azo dye monomer of the structure:

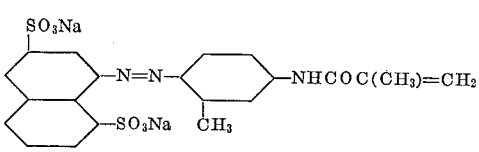

A fugitive polymeric dye may be prepared using the above dye monomer in place of the dye monomer of Example 48.

EXAMPLE 52

Example 48 may be repeated using the disodium salt of Freund's acid (4-aminonaphthalene-2,7-disulfonic acid) in place of amino G acid salt to give a yellow azo dye monomer of the structure:

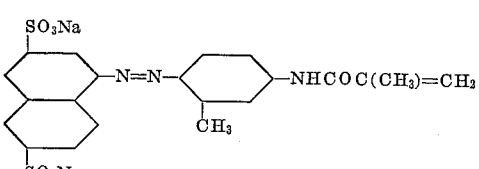

A fugitive polymeric dye may be prepared using the above dye monomer in place of the dye monomer of Example 48.

EXAMPLE 53

Example 48 may be repeated using an equal molar amount of the disodium salt of aniline-2,4-disulfonic acid in place of amino G acid salt to give a yellow azo dye monomer of the structure:

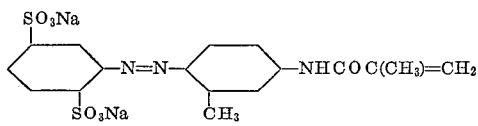

A fugitive polymeric dye may be prepared using an equal molar amount of the above dye monomer in place of the dye monomer of Example 48.

EXAMPLE 54

Using the coupling procedure of Example 1(B), 44 parts of the disodium salt of aniline-2,5-disulfonic acid is first coupled to 17.8 parts of cresidine to give 49.8 parts of an intermediate azoamine of the structure:

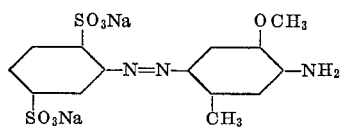

Using the procedure of Example 1(B), 45.0 parts of this amine is then coupled to a coupling component solution prepared by reacting 45.0 parts of the disodium salt of H acid with 17.9 parts of methacryloyl chloride following the procedure of Example 1(A), to give a blue disazo dye monomer of the structure:

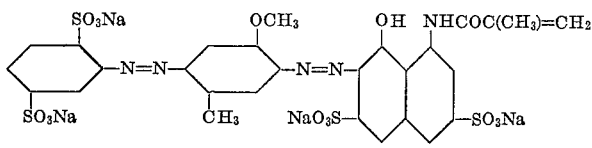

A fugitive polymeric dye is prepared by the polymerization procedure of Example 1(C) using 4.9% of the above dye monomer, 31.0% of methacrylic acid and 64.1% of methyl methacrylate. The resulting polymer has an absorptivity of 0.83 at 596 m$\mu$ in dilute aqueous ammonia. When padded on multi-fiber No. 4 swatches from dilute aqueous ammonia as described in Example 1(D), all fibers are colored blue. The dye is fugitive to scouring on all fibers.

EXAMPLE 55

Example 54 may be repeated using an equal molar amount of aniline in place of cresidine to give a violet disazo dye monomer of the structure:

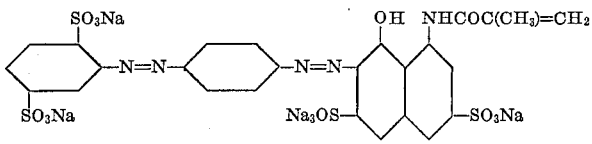

A fugitive polymeric dye may be prepared using an equal molar amount of the above dye monomer in place of the dye monomer of Example 54.

EXAMPLE 56

Example 54 may be repeated using an equal molar amount of p-xylidine in place of cresidine to give a violet disazo dye monomer of the structure:

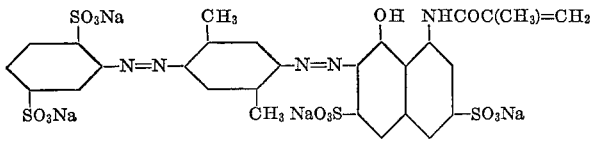

A fugitive polymeric dye may be prepared using an equal molar amount of the above dye monomer in place of the dye monomer of Example 54.

EXAMPLE 57

Example 54 may be repeated using an equal molar amount of o-toluidine in place of cresidine to give a violet disazo dye monomer of the structure:

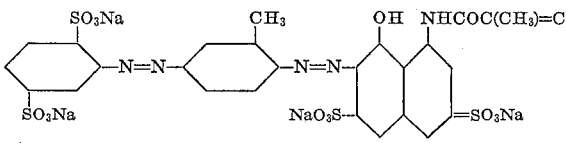

A fugitive polymeric dye may be prepared using an equal molar amount of the above dye monomer in place of the dye monomer of Example 54.

EXAMPLE 58

Example 54 may be repeated using an equal molar amount of m-toluidine in place of cresidine to give a violet disazo dye monomer of the structure:

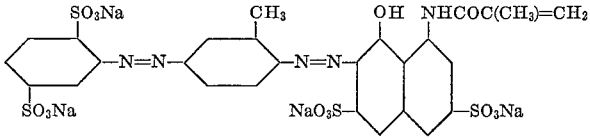

A fugitive polymeric dye may be prepared using an equal molar amount of the above dye monomer in place of the dye monomer of Example 54.

EXAMPLE 59

Example 54 may be repeated using the disodium salt of B acid (8-amino-1-naphthol-4,6-disulfonic acid) in place of H acid salt to give a blue disazo dye monomer of the structure:

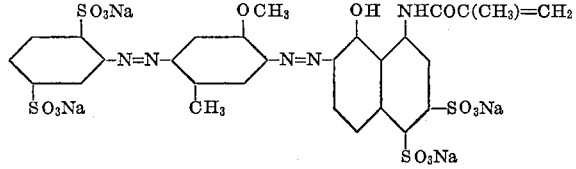

A fugitive polymeric dye may be prepared using the above dye monomer in place of the dye monomer of Example 54.

EXAMPLE 60

Example 54 may be repeated using the disodium salt of Chicago acid (8-amino-1-naphthol-5,7-disulfonic acid in place of H acid salt to give a blue disazo dye monomer of the structure:

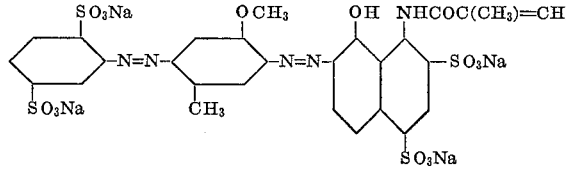

A fugitive polymeric dye may be prepared using the above dye monomer in place of the dye monomer of Example 54.

EXAMPLE 61

Example 54 may be repeated using the disodium salt of K acid (8-amino-1-naphthol-3,5-disulfonic acid) in place of H acid salt to give a blue disazo dye monomer of the structure:

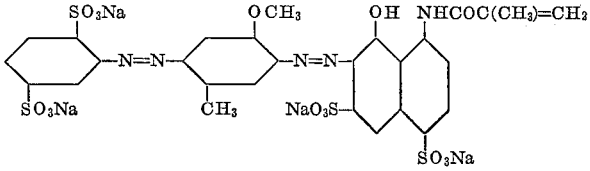

A fugitive polymeric dye may be prepared using the above dye monomer in place of the dye monomer of Example 54.

EXAMPLE 62

Example 54 may be repeated using the disodium salt of RR acid (7-amino-1-naphthol-3,6-disulfonic acid) in place of H acid salt to give a blue disazo dye monomer of the structure:

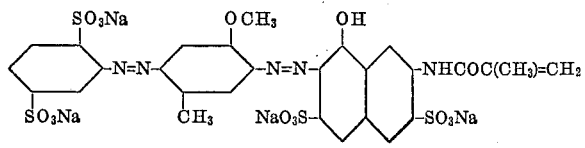

A fugitive polymeric dye may be prepared using the above dye monomer in place of the dye monomer of Example 54.

EXAMPLE 63

Example 54 may be repeated using an equal molar amount of the sodium salt of 5-amino-2-naphthol-8-sulfonic acid in place of H acid salt to give a blue disazo dye monomer of the structure:

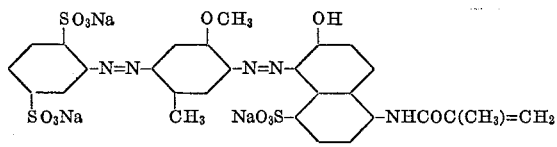

A fugitive polymeric dye may be prepared using an equal molar amount of the above dye monomer in place of the dye monomer of Example 54.

EXAMPLE 64

Example 54 may be repeated using the disodium salt of 7-amino-2-naphthol-3,6-disulfonic acid in place of H acid salt to give a blue disazo dye monomer of the structure:

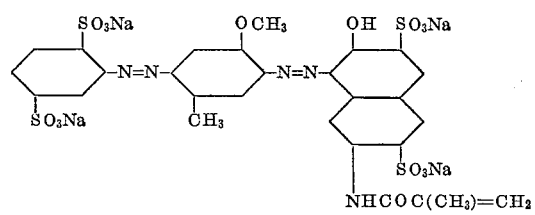

A fugitive polymeric dye may be prepared using the above dye monomer in place of the dye monomer of Example 54.

EXAMPLE 65

Example 54 may be repeated using the disodium salt of 5-amino-2-naphthol-3,7-disulfonic acid in place of H acid salt to give a blue disazo dye monomer of the structure:

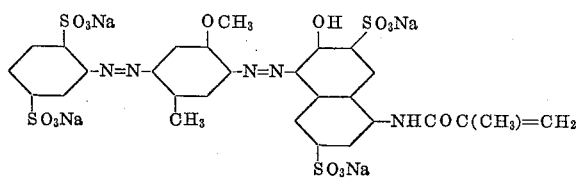

A fugitive polymeric dye may be prepared using the above dye monomer in place of the dye monomer of Example 54.

EXAMPLE 66

Using the procedure of Example 1(B), 13.1 parts of the sodium salt of 4-nitroaniline-2-sulfonic acid is coupled to 7.5 parts of cresidine to give 15.6 parts of azoamine. A 7.8-part portion of the azoamine is then coupled to a coupling component solution prepared from 18 parts of the disodium salt of H acid and 7.2 parts of methacryloyl chloride following the procedure of Example 1(A), to give a blue disazo dye monomer of the structure:

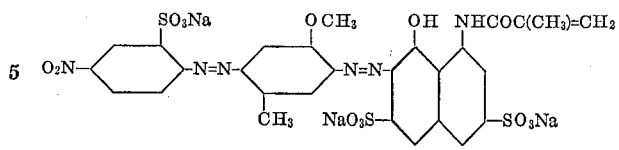

Using the procedure of Example 1(C), a polymeric dye is prepared from 2.0 parts of the above dye monomer, 12.6 parts of methacrylic acid and 26.1 parts of methyl methacrylate. The properties of this polymer as a fugitive dye are analogous to those of the polymer of Example 54.

EXAMPLE 67

Using the procedure of Example 1(B), 85 parts of the disodium salt of aniline-2,5-disulfonic acid is coupled to 37.5 parts of a α-naphthylamine to give 90 parts of azoamine. A 45-part portion of the azoamine is coupled to a coupling component solution prepared by reacting 90 parts of the disodium salt of H acid with 35.8 parts of methacryloyl chloride using the procedure of Example 1(A) to give a blue disazo dye monomer of the structure:

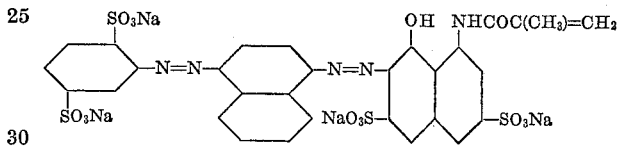

Using the procedure of Example 1(C), a blue polymeric dye is prepared from 2.0 parts of the above dye monomer, 12.6 parts of methacrylic acid and 26.1 parts of methyl methacrylate. The properties of this polymer as a fugitive dye are essentially the same as the polymer of Example 54.

EXAMPLE 68

Example 67 may be repeated using the disodium salt of 7-amino-2-naphthol-3,6-disulfonic acid in place of H acid salt to give a blue disazo dye monomer of the structure:

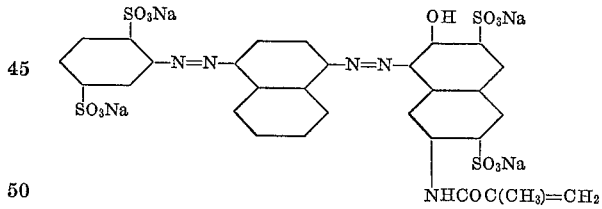

A fugitive polymeric dye may be prepared using the above dye monomer in place of the dye monomer in place of the dye monomer of Example 67.

EXAMPLE 69

Example 67 may be repeated using an equal molar amount of the sodium salt of 5-amino-2-naphthol-7-sulfonic acid in place of H acid salt to give a blue disazo dye monomer of the structure:

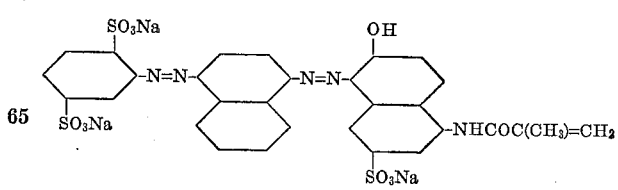

A fugitive polymeric dye may be prepared using an equal molar amount of the above dye monomer in place of the dye monomer of Example 67.

EXAMPLE 70

Example 67 may be repeated using an equal molar amount of the sodium salt of 6-amino-2-naphthol-4-sulfonic acid in place of H acid salt to give a blue disazo dye monomer of the structure:

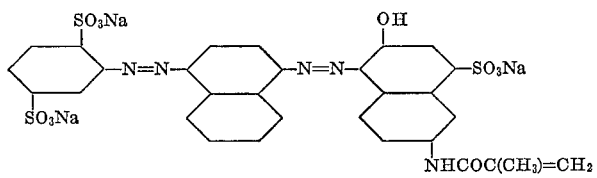

A fugitive polymeric dye may be prepared using an equal molar amount of the above dye monomer in place of the dye monomer of Example 67.

EXAMPLE 71

Example 67 may be repeated using an equal molar amount of the sodium salt of 6-amino-2-naphthol-8-sulfonic acid in place of H acid salt to give a blue disazo dye monomer of the structure:

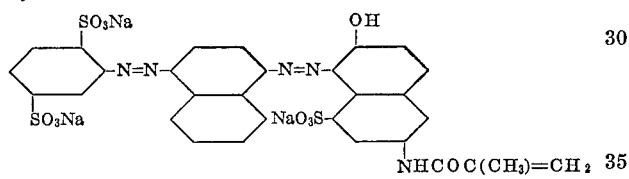

A fugitive polymeric dye may be prepared using an equal molar amount of the above dye monomer in place of the dye monomer of Example 67.

EXAMPLE 72

Using the procedure of Example 1(B), benzidine may be converted to the tetrazonium salt and coupled first to 1-phenol-3-sulfonic acid and then to a methacryloyl coupling component prepared by the procedure of Example 1(A) except that 0.2 mole of 5-amino-2-naphthol-3,7-disulfonic acid is used in place of H acid to give a blue disazo dye monomer of the structure:

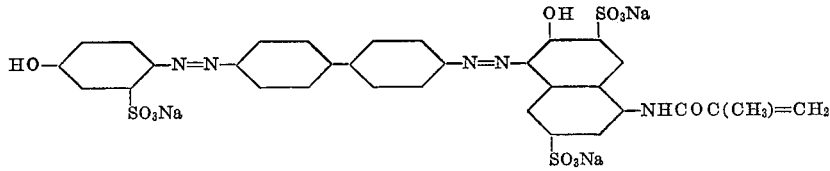

A fugitive polymeric dye may be prepared by the polymerization procedure of Example 1(C) using an equal molar amount of the above dye monomer in place of the dye monomer of that example.

EXAMPLE 73

Using the procedure of Example 1(B), 24.5 parts of 3,3'-dimethoxybenzidine is converted to the tetrazonium salt and coupled first to 48.4 parts of the disodium salt of Epsilon acid (1-naphthol-3,6-disulfonic acid) and then to a coupling component solution prepared by reacting 45 parts of the disodium salt of H acid with 17.9 parts of methacryloyl chloride using the procedure of Example 1(A) to give 110 parts of a blue disazo dye monomer of the structure:

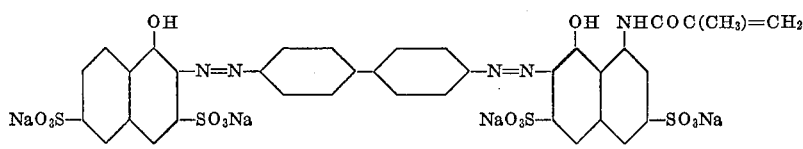

A fugitive polymeric dye may be prepared by the polymerization procedure of Example 1(C) using an equal molar amount of the above dye monomer in place of the dye monomer of that example.

EXAMPLE 74

Example 73 may be repeated using an equal molar amount of benzidine in place of 3,3'-dimethoxybenzidine to give a blue disazo dye monomer of the structure:

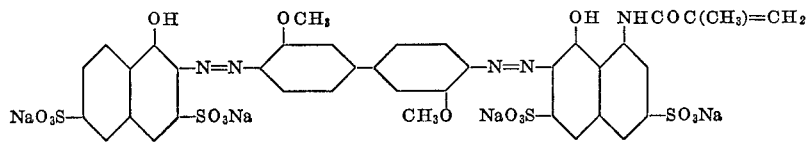

A fugitive polymeric dye may be prepared using an equal molar amount of the above dye monomer in place of the dye monomer of Example 73.

EXAMPLE 75

Example 73 may be repeated using the disodium salt of 1-naphthol-4,7-disulfonic acid in place of Epsilon acid salt to give a blue disazo dye monomer of the structure:

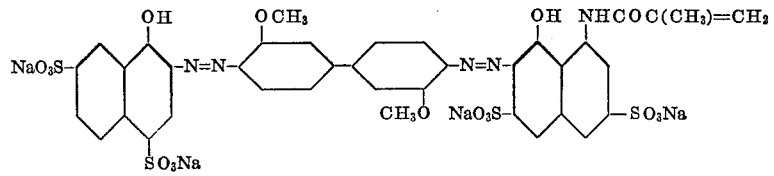

A fugitive polymeric dye may be prepared using the above dye monomer in place of the dye monomer of Example 73.

EXAMPLE 76

Example 73 may be repeated using the disodium salt of B acid (8-amino-1-naphthol-4,6-disulfonic acid) in place of H acid salt to give a blue disazo dye monomer of the structure:

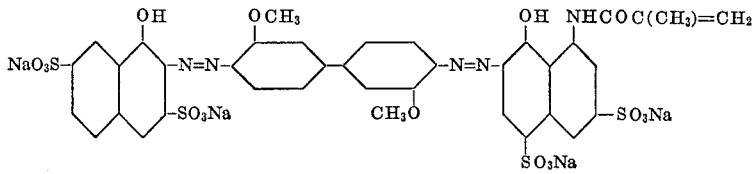

A fugitive polymeric dye may be prepared using the above dye monomer in place of the dye monomer of Example 73.

EXAMPLE 77

Example 73 may be repeated using the disodium salt of K acid (8-amino-1-naphthol-3,5-disulfonic acid) in place of H acid salt to give a blue disazo dye monomer of the structure:

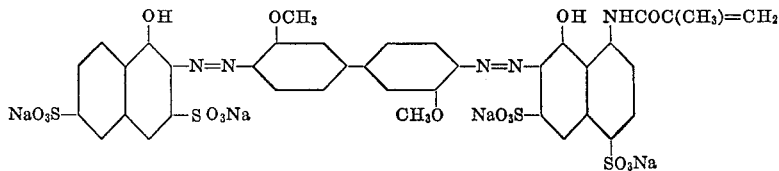

A fugitive polymeric dye may be prepared using the above dye monomer in place of the dye monomer of Example 73.

EXAMPLE 78

(A) Sulfoethylaminobenzaldehyde is prepared as follows: a mixture of 290 parts of p-[N-methyl-N-(2'-chloroethyl)]aminobenzaldehyde, 189 parts of sodium sulfite, 15 parts of sodium dihydrogenphosphate and 567 parts of water is heated under reflux with agitation for 13 hours. The product is then isolated by evaporation of water by drum drying and extracted with a minimum amount of hot dimethylformamide to separate it from NaCl. The resulting hot solution is diluted with six volumes of hot isopropanol and then cooled. The precipitated product is collected by filtration and dried, giving an N-sulfoethylaminobenzaldehyde of the structure:

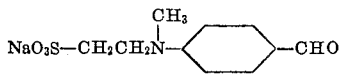

(B) A methine dye is prepared as follows: A mixture of 183 parts of the above N-sulfoethylaminobenzaldehyde, 88.5 parts of N-cyanoacetylethanolamine (prepared by heating ethanolamine with ethylcyanoacetate in ethanol solution for two hours) as a 29.5% solution in ethanol, 302 parts of ethanol and 5 parts of piperidine is heated under reflux for one hour with agitation under nitrogen. The resulting product is crystallized from solution, collected by filtration, washed with a minimum quantity of cold ethanol and dried. The product is a β-sulfoethyl ethanolamide of the structure:

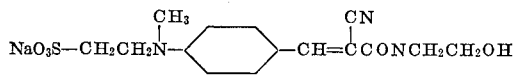

(C) A methine dye monomer is prepared as follows: A mixture of 1440 parts of the above β-sulfoethyl ethanol amide, 2200 parts of dimethyl acetamide, 118 parts of triethylamine and 122 parts of methacryloyl chloride is stirred for 20 minutes at room temperature and then for five minutes at 80° C. The mixture is filtered to remove triethylamine hydrochloride and then evaporated to dryness under reduced pressure to giving a yellow methine dye monomer of the structure:

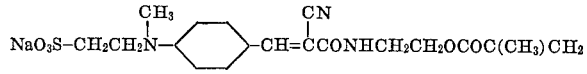

(D) A polymeric methine dye is prepared following the procedure of Example 1(C) using 12.2 parts of the above dye monomer, 11 parts of methacrylic acid and 11.7 parts of butyl methacrylate. When padded from dilute aqueous ammonia to multi-fiber No. 4 swatches, all fibers are colored yellow. Fugitiveness is satisfactory on all fibers when scoured as in Example 1(D).

EXAMPLE 79

Example 78 may be repeated using an equal molar amount of p-[N-ethyl-N-(2'-chloroethyl)]aminobenzaldehyde in place of p-[N-methyl-N-(2'-chloroethyl)] aminobenzaldehyde in step (A) to give a yellow methine dye of the structure:

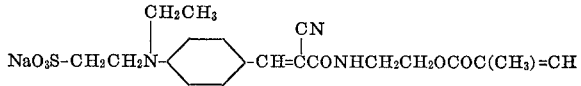

A fugitive polymeric dye may be prepared using an equal molar amount of the above dye monomer in place of the dye monomer of Example 78.

EXAMPLE 80

(A) Aminophenoxyethanol is prepared as follows: A mixture of 208.5 parts p-nitrophenol, 60.0 parts sodium hydroxide and 500 parts water is heated at 80° C. with agitation until solution is complete. Then 121 parts ethylene oxide are added dropwise over a 30 minute period. The resulting mixture is heated for 16 hours at 80° C., then cooled. To the cooled mass, 20 parts sodium hydroxide in 45 parts water and 40 parts ethylene chlorohydrin are added, followed by again heating at 80° C. for 16 hours. On cooling 2-(p-nitrophenoxy)ethanol precipitated and is collected by filtration.

A mixture of 360 parts sodium sulfide hydrate, 47.5 parts sulfur and 400 parts water is heated to 100° C. with agitation. Then 230 parts of the above nitrophenoxyethanol is added dropwise and the mixture heated under reflux for 24 hours. On cooling, 2-(p-aminophenoxy)-ethanol precipitates and is collected by filtration.

(B) An anthraquinone dye is prepared as follows: A mixture of 198 parts water, 0.65 part copper sulfate pentahydrate, 9.65 parts of the above aminophenoxy ethanol and 25.1 parts of bromamine acid (1-amino-4-bromo-anthraquinone-2-sulfonic acid) is heated slowly to 80° C. with agitation and maintained for 20 hours. The mixture is then cooled, diluted with 3300 parts water and heated to 50° C. While cooling slowly, 450 parts sodium chloride are added portionwise. The desired product of the structure:

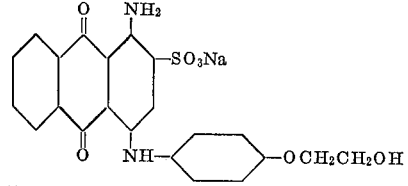

is crystallized, collected by filtration and dried.

*Analysis.*—Calculated for $C_{22}H_{17}N_2O_7Na$ (percent): C, 55.5; H, 3.6; N, 5.9; S, 6.7; Na, 4.8. Found (percent): C, 49.2; H, 3.4; N, 5.2; S, 6.0; Na, 6.7; NaCl, 7.6.

(C) An anthraquinone dye monomer is prepared as follows: A mixture of 224 parts of the anthraquinone dye prepared above, 860 parts of dimethylacetamide, 171 parts of triethylamine and 53.3 parts of methacryloyl chloride is stirred for 20 hours at room temperature and then heated at 80° C. for five minutes. Triethylamine hydrochloride is removed by filtration and the filtrate evaporated to dryness under reduced pressure thereby giving a blue anthraquinone dye monomer of the structure:

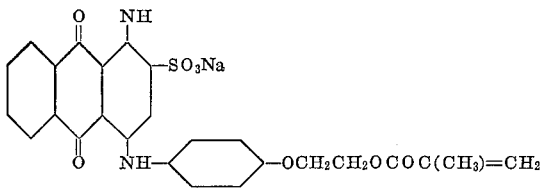

Calculated for $C_{26}H_{21}N_2SO_8Na$ (percent): C, 57.4; H, 3.9; N, 5.2; S, 5.9; Na, 4.2. Found (percent): C, 52.8; H, 5.1; N, 6.1; S, 4.5; Na, 3.9.

(D) Three polymeric anthraquinone dyes are prepared from the above dye monomer using the general procedure of Example 1(C). The percentages of monomers charged are as follows:

| Polymer | Dye monomer | Methacrylic acid | n-Butyl methacrylate |
|---|---|---|---|
| I | 4.3 | 25.0 | 70.7 |
| II | 8.6 | 25.4 | 66.4 |
| III | 4.3 | 35.0 | 60.7 |

The three resulting polymers have the following characteristics in which absorptivity is measured in dimethylformamide:

| Polymer | Acid No. | Calcd. percent methacrylic acid | Absorptivity a 625 mµ |
|---|---|---|---|
| I | 165, 166 | 25.3, 25.5 | 0.84 |
| II | 172, 175 | 26.4, 26.8 | 1.65 |
| III | 228, 229 | 34.9, 35.1 | 0.90 |

The three blue polymeric dyes are padded on multifiber No. 4 swatches as described in Example 1(D) coloring all fiber types blue. When scoured, all three dyes are fugitive on all fibers.

EXAMPLE 81

An anthraquinone dye is prepared following the procedure of Example 80(B) except that an equal molar amount of ethanolamine is substituted for aminophenoxyethanol. The resulting dye has the structure:

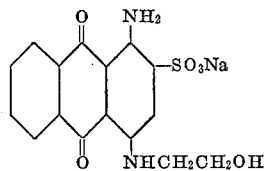

An anthraquinone dye monomer is prepared from the above anthraquinone dye following the procedure of Example 80(C). The resulting product is a purple-blue ester of the structure:

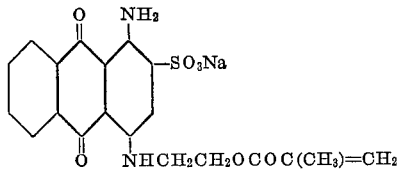

Fugitive polymeric anthraquinone dyes may be prepared by the procedure of Example 80(D) using an equal molar amount of the above dye monomer in place of the dye monomer of that example.

EXAMPLE 82

An anthraquinone dye monomer is prepared by first reacting an excess of p-phenylenediamine with one mole of bromamine acid using the procedure of Example 80(C) and then reacting the resulting amine with methacryloyl chloride using the procedure of Example 1(A) thereby giving a blue dye monomer of the structure:

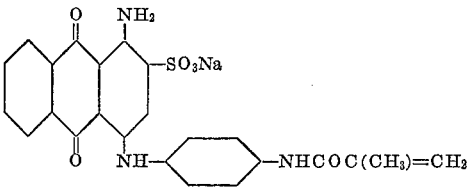

A polymeric anthraquinone dye is prepared using 1.6 parts of the above dye monomer, 7.2 parts of methacrylic acid and 14.7 parts of n-butyl methacrylate following the polymerization procedure of Example 1(C).

The resulting polymer, when tested as a fugitive dye, has essentially the same characteristics as the dyes of Example 80(D).

EXAMPLE 83

Example 82 may be repeated except that aqueous ammonia is used in place of p-phenylenediamine to give a blue anthraquinone dye monomer of the structure:

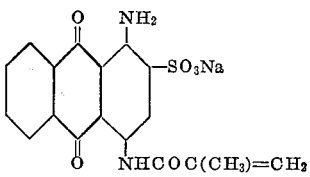

A fugitive polymeric dye may be prepared using an equal molar amount of the above dye monomer in place of the dye monomer of Example 82.

Although the invention has been described and exemplified by way of specific embodiments, it is to be understood that it is not limited thereto. As will be apparent to those skilled in the art, numerous modifications and variations of the embodiments illustrated above may be made without departing from the spirit of the invention.

The embodiments of the invention in which an exclusive property or privilege is claimed are defined as follows:

1. A fugitive dye consisting of polymeric dye in which the polymer-forming units are derived
   (a) 30 to 94.5% by weight from alkyl methacrylate ester in which the alkyl group contains 1 to 18 carbon atoms,
   (b) 5 to 60% by weight from methacrylic acid or a water-soluble salt thereof selected from alkali metal salts, ammonium salts, and substituted ammonium salts derived from water soluble amines, and
   (c) 0.5 to 50% by weight from dye monomer of the structure $DX-COC(CH_3)=CH_2$ in which DX— is a dye residue derived from an azo dye of the formula DX—H, which dye contains at least one sulfonic acid group or water-soluble salt thereof selected from alkali metal salts, ammonium salts, and substituted ammonium salts derived from water soluble amines, and X is

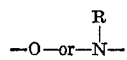

wherein R is hydrogen or lower alkyl;
said polymeric dye having a minimum water solubility of at least 5% at a pH greater than 7 and a maximum water solubility of less than 1% at a pH of 3, and said dye monomer being at least ten times as soluble in water as said polymeric dye at a pH of 3.

2. A fugitive dye of claim 1 in which the polymer-forming units are derived 50 to 80% from an alkyl methacrylate ester in which the alkyl group contains 1 to 14 carbon atoms, 10 to 45% from methacrylic acid and 2 to 15% from a dye monomer which does not noticeably change shade when subjected to pH changes in the range of 3 to 10.

3. A fugitive dye of claim 2 in which the dye monomer is an azo dye of the formula:

(I) 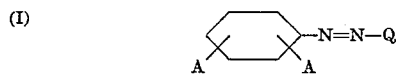

in which each A is H, SO₃H, a water-soluble salt of SO₃H, NO₂, Cl, or CH₃, Q is

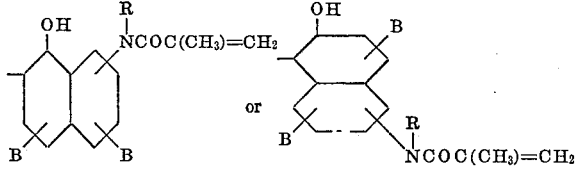

wherein each B is H, SO₃H or a water-soluble salt of SO₃H and R is H or lower-alkyl, and at least one of the A's or B's is SO₃H or a water-soluble salt thereof, (II) 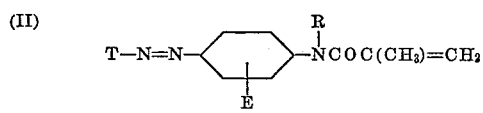

in which R is as described before, E is H, CH₃, OCH₃ or NHCOCH₃, and T is

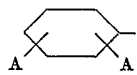

wherein A is as described before, and at least one A is SO₃H or a water-soluble salt thereof, or

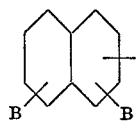

wherein B is as described before and at least one B is SO₃H or a water-soluble salt thereof, (III) 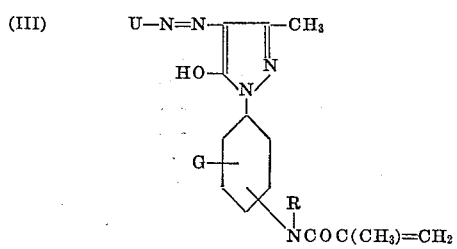

in which R is as described before, G is H, CH₃ or Cl, and U is

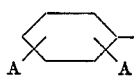

wherein A is as described before, and at least one A is SO₃H or a water-soluble salt thereof, or

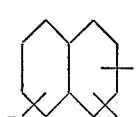

wherein B is as described before, and at least one B is SO₃H or a water-soluble salt thereof, (IV) 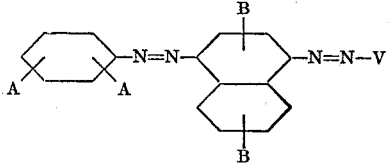

in which A and B are as described before, V is

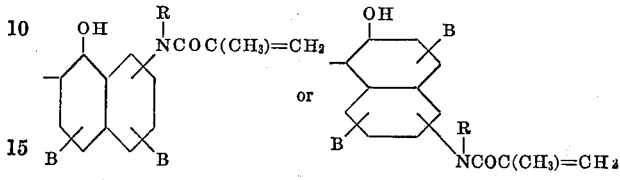

wherein R is as described before, and at least two or the A's and B's are SO₃H or a water-soluble salt thereof, (V) 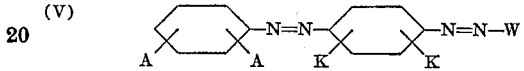

in which A is as described before, each K is H, CH₃ or OCH₃, W is

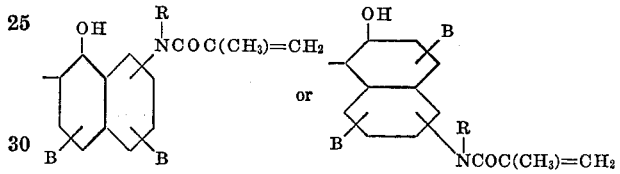

wherein B and R are as described before, and at least two of the A's and B's are SO₃H or a water-soluble salt thereof, or (VI) 

in which K is as described before, Y is

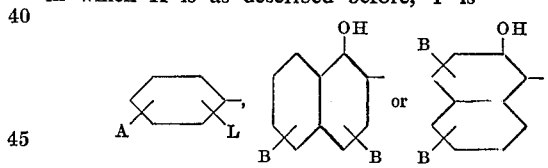

and Z is

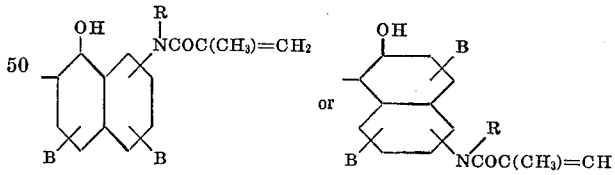

wherein A, B and R are as described before, L is NH₂, OH or OCH₃, and at least two of the A's and B's are SO₃H or a water-soluble salt thereof.

4. A fugitive dye of claim 3 in which the dye monomer is of the formula:

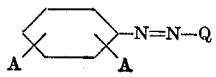

in which each A is H, SO₃H, a water-soluble salt of SO₃H, NO₂, Cl or CH₃, Q is

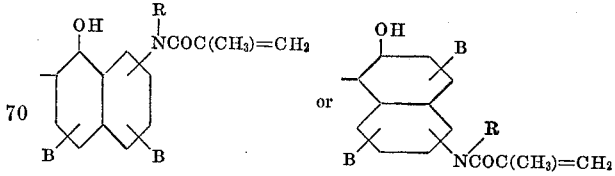

wherein each B is H, SO₃H or a water-soluble salt of SO₃H and R is H or lower-alkyl, and at least one of the A's or B's is SO₃H or a water-soluble salt thereof.

5. A fugitive dye of claim 3 in which the dye monomer is of the formula:

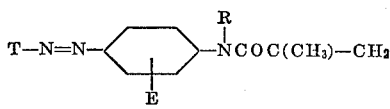

in which R is H or lower-alkyl, E is H, CH$_3$, OCH$_3$ or NHCOCH$_3$, and T is

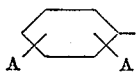

wherein each A is H, SO$_3$H, a water-soluble salt of SO$_3$H, NO$_2$, Cl or CH$_3$, and at least one A is SO$_3$H or a water-soluble salt thereof, or

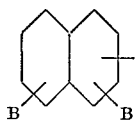

wherein each B is H, SO$_3$H or a water-soluble salt of SO$_3$H, and at least one B is SO$_3$H or a water-soluble salt thereof.

6. A fugitive dye of claim 3 in which the dye monomer is of the formula:

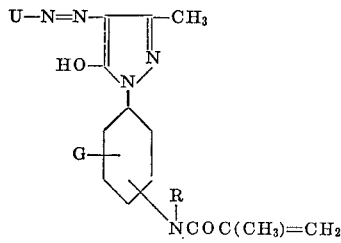

in which R is H or lower-alkyl, G is H, CH$_3$ or Cl, and U is

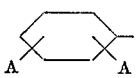

wherein each A is H, SO$_3$H, a water-soluble salt of SO$_3$H, NO$_2$, Cl or CH$_3$, and at least one A is SO$_3$H or a water-soluble salt thereof, or

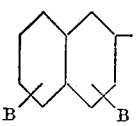

wherein each B is H, SO$_3$H or a water-soluble salt of SO$_3$H, and at least one B is SO$_3$H or a water-soluble salt thereof.

7. A fugitive dye of claim 3 in which the dye monomer is of the formula

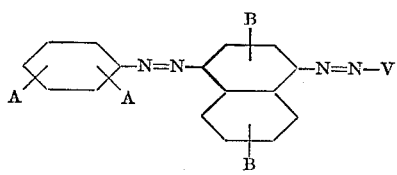

in which each A is H, SO$_3$H, a water-soluble salt of SO$_3$H, NO$_3$, Cl or CH$_3$, and each B is H, SO$_3$H or a water-soluble salt of SO$_3$H, V is

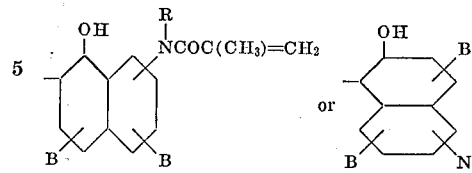

wherein R is H or lower-alkyl, and at least two of the A's and B's are SO$_3$H or a water-soluble salt thereof.

8. A fugitive dye of claim 3 in which the dye monomer is of the formula:

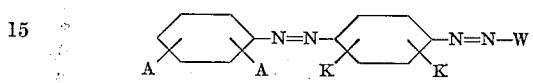

in which each A is H, SO$_3$H, a water-soluble salt of SO$_3$H, NO$_2$, Cl or CH$_3$, each K is H, CH$_3$ or OCH$_3$, W is

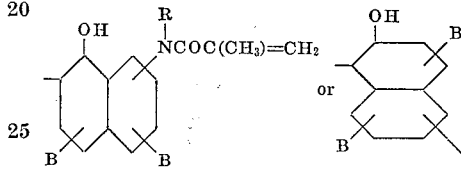

wherein each B is H, SO$_3$H or a water-soluble salt of SO$_3$H, and R is H or lower-alkyl, and at least two of the A's and B's are SO$_3$H or a water-soluble salt thereof.

9. A method of preparing a fugitive dye which comprises preparing the polymeric dye of claim 1 by free radical polymerization in aqueous medium, adjusting the pH of the resulting product medium to above 7, drowning the product in water, adjusting the pH to below 7, thereby causing the polymeric dye to precipitate from the remaining aqueous medium, redissolving the precipitate in water at a pH above 7, adjusting the pH to below 7 thereby reprecipitating the polymeric dye, and separating polymeric dye essentially free of unreacted dye monomer.

10. The method of claim 9 in which the polymeric dye of claim 2 is prepared.

11. The method of claim 10 in which the polymeric dye of claim 3 is prepared.

References Cited

UNITED STATES PATENTS

| | | | |
|---|---|---|---|
| 2,719,831 | 10/1955 | Craemer et al. | 260—80.72 |
| 3,163,625 | 12/1964 | Firestine et al. | 260—80.5 |
| 3,190,860 | 6/1965 | Fertig | 260—80.73 |
| 3,193,536 | 7/1965 | Wagner et al. | 260—79.3 |
| 3,232,691 | 2/1966 | Wilhelm et al. | 260—144 XR |
| 3,251,743 | 5/1966 | Hahn et al. | 260—86.1 XR |
| 3,337,288 | 8/1967 | Horgiuchi et al. | 260—144 XR |
| 3,344,098 | 9/1967 | Horgiuchi et al. | 260—80.72 XR |
| 3,340,221 | 9/1967 | Goldberg et al. | 260—144 XR |
| 3,364,186 | 1/1968 | Wilhelm et al. | 260—80.72 |

FLOYD D. HIGEL, Primary Examiner

U.S. Cl. X.R.

260—144, 158, 80.72, 80.73, 80.81, 86.12, 248, 199, 160, 162, 163, 201, 207.1, 196, 187, 181, 508, 465, 371, 372